United States Patent
Fellon et al.

(10) Patent No.: US 12,553,591 B2
(45) Date of Patent: Feb. 17, 2026

(54) SYSTEMS AND METHODS FOR DETERING THEFT OF INTERNAL COMPONENTS OF STREETLIGHTS

(71) Applicants: Dave Fellon, St. Paul, MN (US); Jace Fellon, St. Paul, MN (US)

(72) Inventors: Dave Fellon, St. Paul, MN (US); Jace Fellon, St. Paul, MN (US)

(73) Assignees: Dave Fellon, St. Paul, MN (US); Jace Fellon, St. Paul, MN (US)

( * ) Notice: Subject to any disclaimer, the term of this patent is extended or adjusted under 35 U.S.C. 154(b) by 0 days.

(21) Appl. No.: 19/056,273

(22) Filed: Feb. 18, 2025

(65) Prior Publication Data

US 2025/0264209 A1 Aug. 21, 2025

Related U.S. Application Data

(60) Provisional application No. 63/555,249, filed on Feb. 19, 2024.

(51) Int. Cl.
*F21V 15/00* (2015.01)
*E04H 12/00* (2006.01)
(Continued)

(52) U.S. Cl.
CPC ............ *F21V 15/005* (2013.01); *F21S 8/088* (2013.01); *F21V 15/01* (2013.01); *F21V 23/002* (2013.01); *H02G 3/0493* (2013.01); *E04H 12/003* (2013.01); *E05B 65/0064* (2013.01); *F21S 8/085* (2013.01); *H02G 2200/10* (2013.01)

(58) Field of Classification Search
CPC ... F21V 15/005; E04H 12/003; E05B 65/006; E05B 65/0064; H02G 2200/10; A63F 9/0811; A63F 2009/1292
See application file for complete search history.

(56) References Cited

U.S. PATENT DOCUMENTS 2,839,842 A * 6/1958 Keyko ................. A63F 9/1288
273/156
4,461,222 A 7/1984 Brunner et al.
(Continued)

FOREIGN PATENT DOCUMENTS

EP 3073593 A1 9/2016
KR 20200097402 A * 8/2020 ........... E04H 12/003

OTHER PUBLICATIONS

Aluminum and Copper Wires-Electrical Resistance Vs. Cross-Sectional Area, The Engineering Toolbox, www.EngineeringToolBox.com. 6 pages, 2022. Accessed Oct. 13, 2022.
(Continued)

*Primary Examiner* — Alexander K Garlen
(74) *Attorney, Agent, or Firm* — Seager, Tufte & Wickhem LLP

(57) ABSTRACT

A streetlight apparatus and method involves use of an anti-theft material for deterring theft of electrical wiring from a streetlight. The anti-theft material includes a stack of rings encircling the electrical wiring in the chamber of the base of the streetlight, where each ring of the stack of rings may include a plurality of ring segments that are each individually insertable through an access opening of the base of the streetlight and positioned around the electrical wiring.

20 Claims, 26 Drawing Sheets

(51) Int. Cl.
    *E05B 65/00*     (2006.01)
    *F21S 8/08*     (2006.01)
    *F21V 15/01*     (2006.01)
    *F21V 23/00*     (2015.01)
    *H02G 3/04*     (2006.01)

(56) References Cited

U.S. PATENT DOCUMENTS

| | | | |
|---|---|---|---|
| 7,311,306 B2 * | 12/2007 | Chuang | A63F 9/10 |
| | | | 273/153 S |
| 7,906,726 B1 * | 3/2011 | Burkett | H02G 3/0418 |
| | | | 70/57.1 |
| 8,302,796 B1 | 11/2012 | Johnson | |
| 8,474,780 B2 | 7/2013 | Parduhn et al. | |
| 8,748,742 B1 | 6/2014 | Cordova et al. | |
| 10,988,954 B2 * | 4/2021 | Ducros | E04H 12/003 |
| 2007/0022706 A1 * | 2/2007 | Fournier | H02G 9/10 |
| | | | 52/848 |
| 2009/0273261 A1 * | 11/2009 | Fournier | E04H 12/2292 |
| | | | 312/237 |
| 2011/0095162 A1 * | 4/2011 | Parduhn | H02G 3/0493 |
| | | | 248/519 |
| 2012/0230004 A1 * | 9/2012 | Atchley | H02G 9/06 |
| | | | 361/825 |
| 2012/0247373 A1 | 10/2012 | Van Dessel | |
| 2012/0266447 A1 * | 10/2012 | Diaz-Vallellanes | H02G 9/06 |
| | | | 248/68.1 |
| 2013/0047552 A1 | 2/2013 | Cocciadiferro | |
| 2013/0077327 A1 * | 3/2013 | Butler | F21V 23/023 |
| | | | 362/431 |
| 2015/0043202 A1 * | 2/2015 | Kosedag | F21S 9/035 |
| | | | 362/183 |
| 2015/0219142 A1 | 8/2015 | Weatherl | |
| 2019/0164398 A1 | 5/2019 | Perreau | |
| 2020/0355335 A1 | 11/2020 | Weber et al. | |

OTHER PUBLICATIONS

Bergal, "Copper Thieves Strike America's Roadways," Huff Post Latest News, 18 pages, Dec. 10, 2018. Accessed Oct. 13, 2022.
Caltrans Division of Research and Innovation summary titled, Design Practices and Products for Deterring Copper Wire Theft, preliminary investigation, produced by Produced by CTC & Associates LLC; published May 22, 2013 (Year: 2013).
Construction Materials: Copper Versus Aluminum Wire, Gordian (Registered), 5 pages, 2022, Accessed Oct. 13, 2022.
Cox, "Copper Thefts Turn Out Lights in Parts of St. Paul," MPR News, 3 pages, May 10, 2022. Accessed Oct. 13, 2022.
Elledge, "Tricks of the Trade," Published in Today's Facility Manager, 5 pages, Jan. 2008. Accessed Oct. 13, 2022.
Gottfried, "How to Stop Wire Heists from St. Paul Street Lights?" Pioneer Press, 5 pages, Published Apr. 13, 2022, Updated Apr. 14, 2022, Accessed Oct. 13, 2022.

* cited by examiner

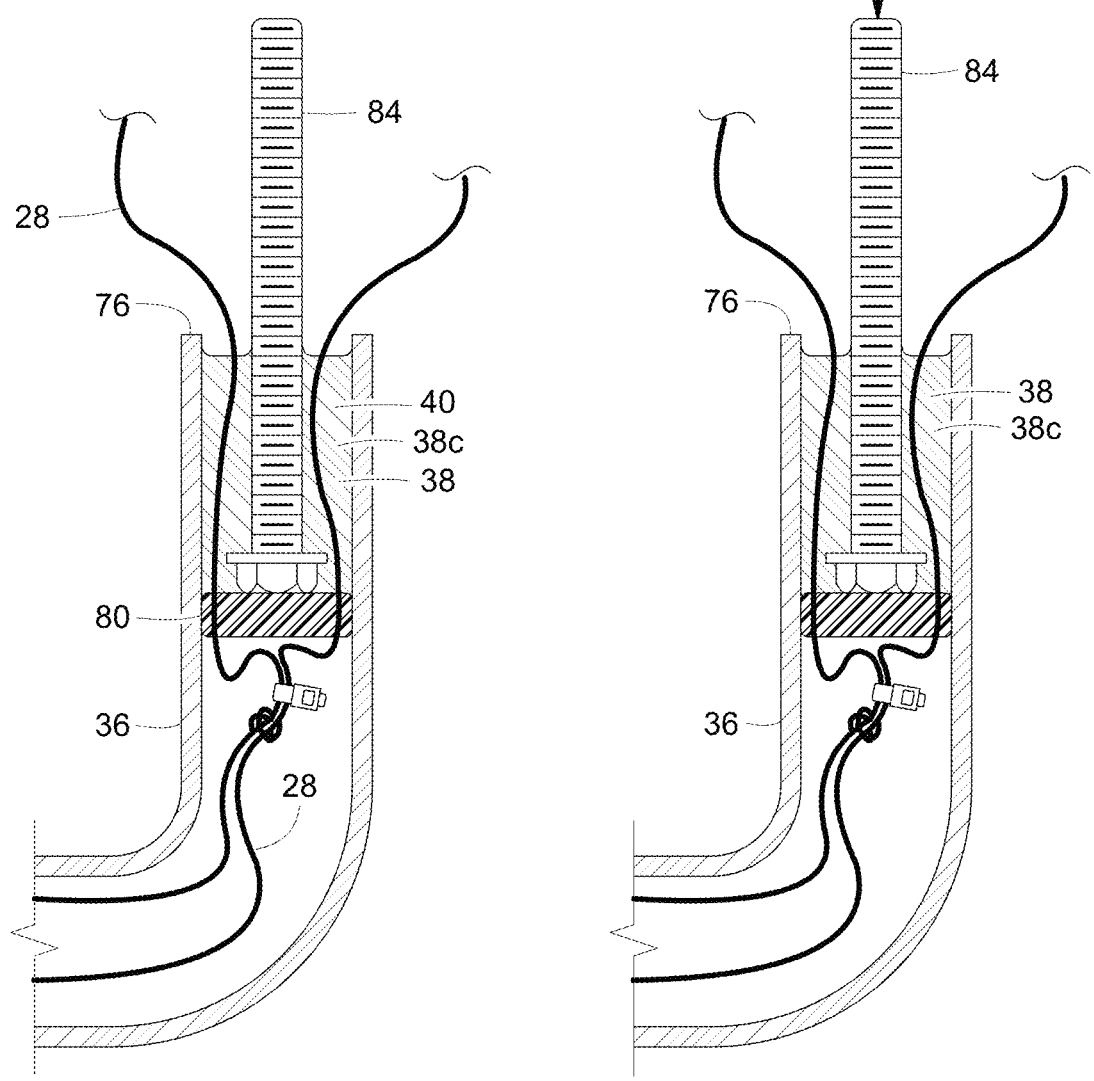

FIG. 21
FIG. 22
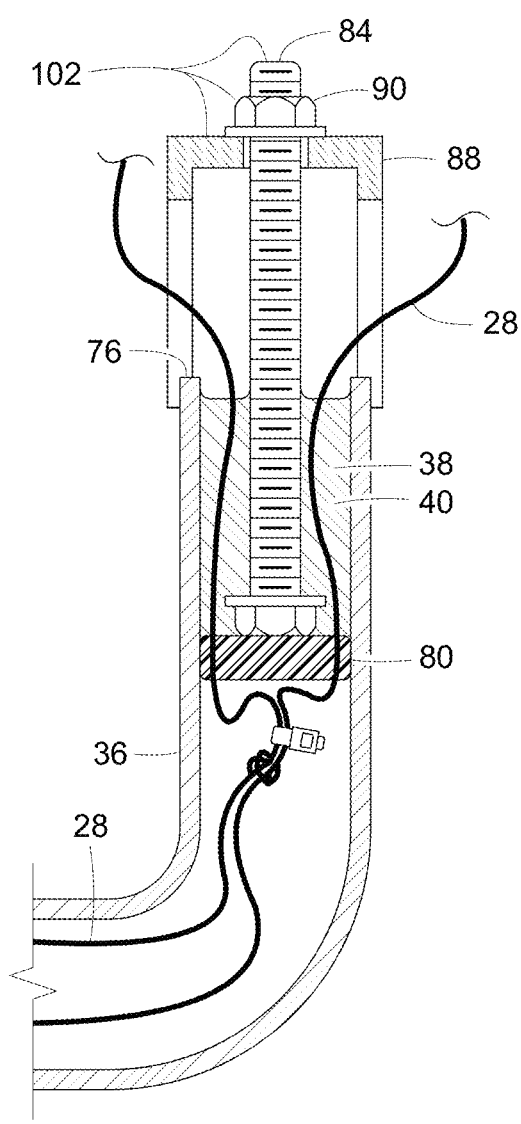
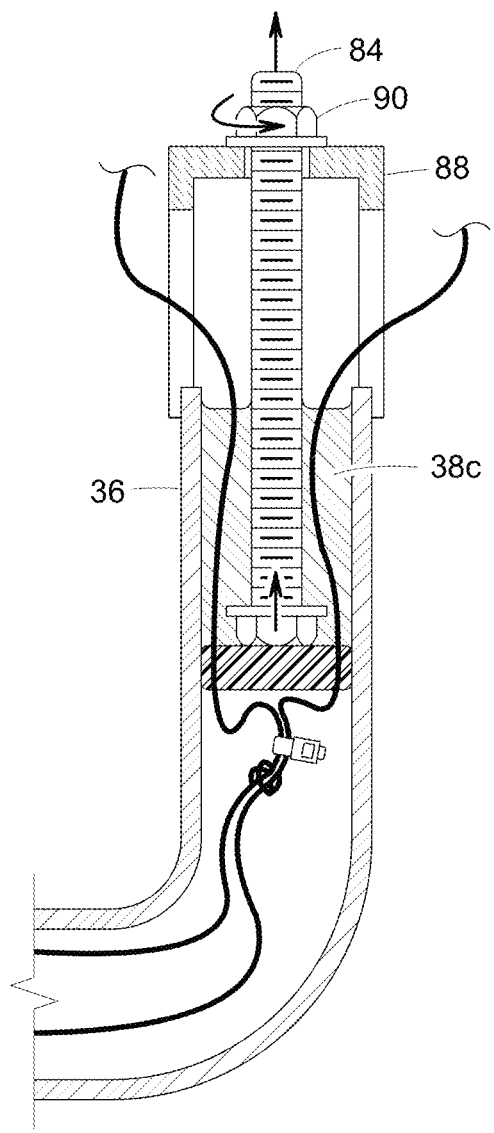

SYSTEMS AND METHODS FOR DETERING THEFT OF INTERNAL COMPONENTS OF STREETLIGHTS

This application claims the benefit of U.S. Provisional Application Ser. No. 63/555,249, filed Feb. 19, 2024, which is incorporated herein by reference.

TECHNICAL FIELD

The disclosure relates generally to streetlights and more particularly to systems and methods for deterring theft of internal components of streetlights.

BACKGROUND

Streetlights typically include a light fixture on top of a tall pole. They are usually installed along streets or walkways. Often there is a long series of streetlights interconnected by electrical wires for powering them. If the wires are made of copper, or some other valuable material, the wires can be susceptible to theft. What would be desirable are systems and methods for deterring theft of internal components such as wires of streetlights and wires between streetlights.

SUMMARY

The present disclosure generally pertains to streetlights and more particularly to systems and methods for deterring theft of internal components of streetlights.

An example streetlight includes a base defining a chamber therein, a removable cover plate attached to the base to cover an access opening that leads to the chamber, a tubular pole extending upward from the base, a light fixture supported by the tubular pole, a conduit leading to the base, an electrical wire extending through the conduit, through the chamber of the base and through at least part of the tubular pole to provide power to the light fixture, and a stack of rings encircling the electrical wire within the chamber of the base, wherein each ring of the stack of rings includes a plurality of ring segments. In some cases, the stack of rings varies in diameter. In some cases, the plurality of ring segments interlock circumferentially. In some cases, the plurality of ring segments are keyed axially.

An example method includes providing a plurality of ring segments through the access opening and into the chamber of the streetlight, and assembling the plurality of ring segments while in the chamber of the streetlight into a plurality of stacked rings that extend around the electrical wires in the chamber. In some cases, assembling the plurality of ring segments includes assembling a first one of the plurality of ring segments with a second one of the plurality of ring segments to form a first ring that extends around the electrical wires in the chamber, assembling a third one of the plurality of ring segments with a fourth one of the plurality of ring segments to form a second ring that extends around the electrical wires in the chamber, and stacking the first ring and the second ring in the chamber around the electrical wires in the chamber in an axial arrangement. This may be repeated to form a sufficient number of stacked rings that extend around the electrical wires in the chamber to deter theft of the electrical wires from the streetlight.

An example kit for providing a protective barrier that impedes thieves from stealing electrical wires from a streetlight includes a plurality of ring segments, wherein each of the plurality of ring segments is configured to be: insertable through the access opening and into the chamber of the streetlight; assemblable in the chamber with at least one other of the plurality of ring segments to form a corresponding ring that extends around the electrical wires in the chamber; and stackable to form a plurality of stacked rings that extend around the electrical wires in the chamber.

The preceding summary is provided to facilitate an understanding of some of the features of the present disclosure and is not intended to be a full description. A full appreciation of the disclosure can be gained by taking the entire specification, claims, drawings and abstract as a whole.

BRIEF DESCRIPTION OF THE DRAWINGS

The disclosure may be more completely understood in consideration of the following description of various illustrative embodiments of the disclosure in connection with the accompanying drawings in which:

FIG. 19 is a cross-sectional view showing the conduit plugged using the method steps of FIGS. 17 and 18;

FIG. 20 is a cross-sectional view showing the use of a set of tools for removing the plug from the conduit;

FIG. 21 is a cross-sectional view showing the set of tools configured for removing the plug from the conduit;

FIG. 22 is a cross-sectional view similar to FIG. 21 but showing the set of tools being used for removing the plug from the conduit;

Figure 1:
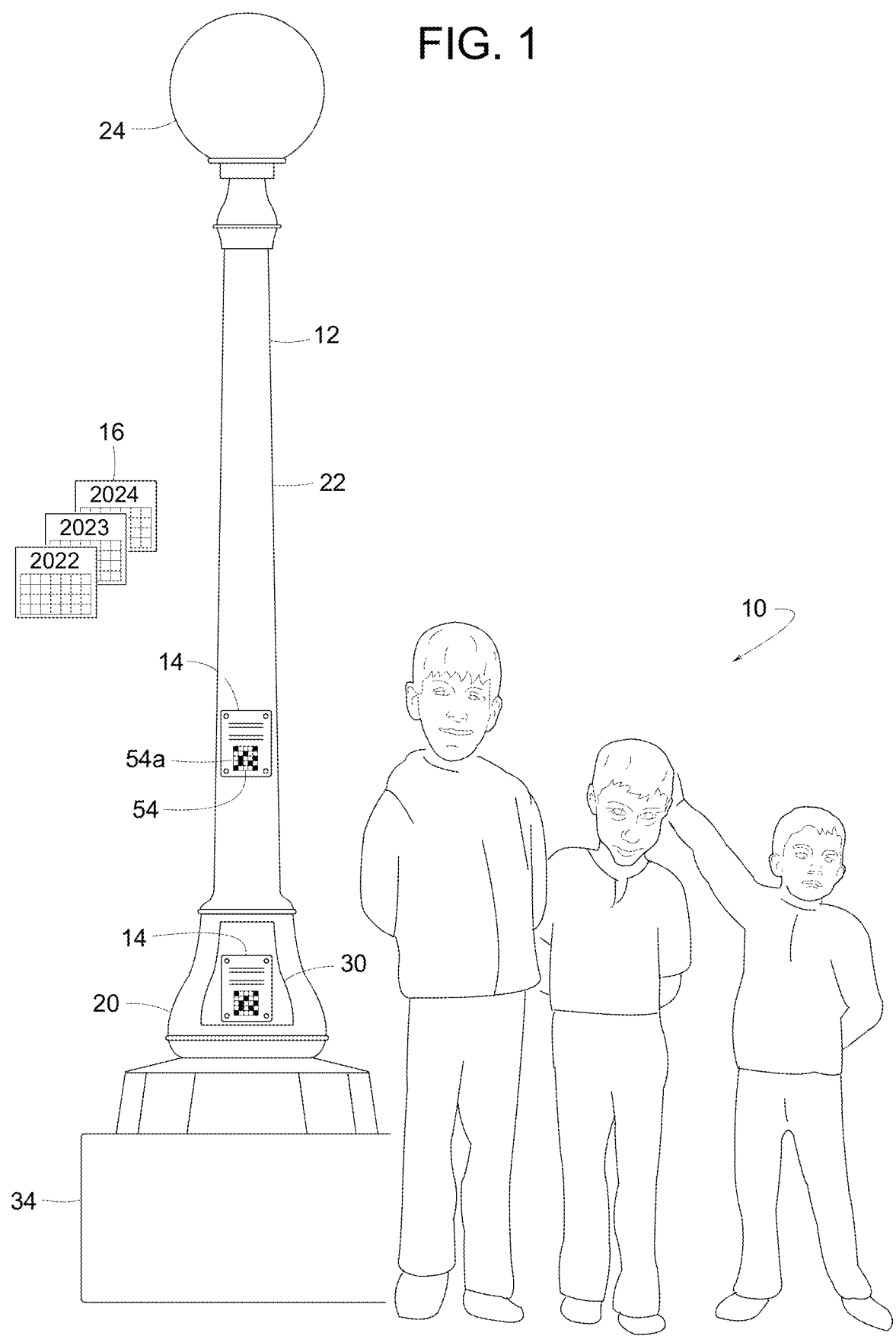
FIG. 1 is a front view of an example modified streetlight next to an example sponsor.
Figure 2:
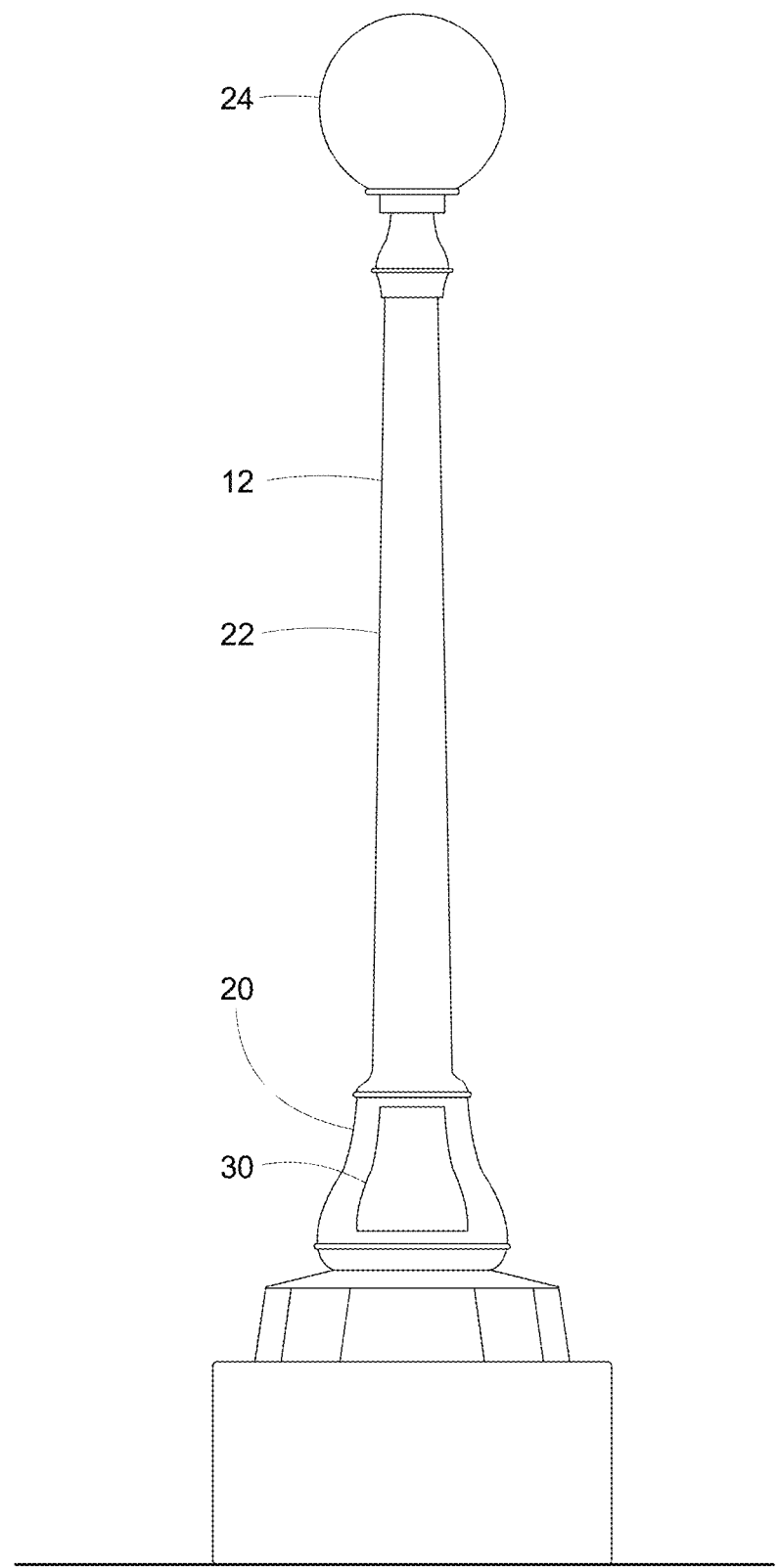
FIG. 2 is a front view of an example streetlight before being modified.
Figure 3:
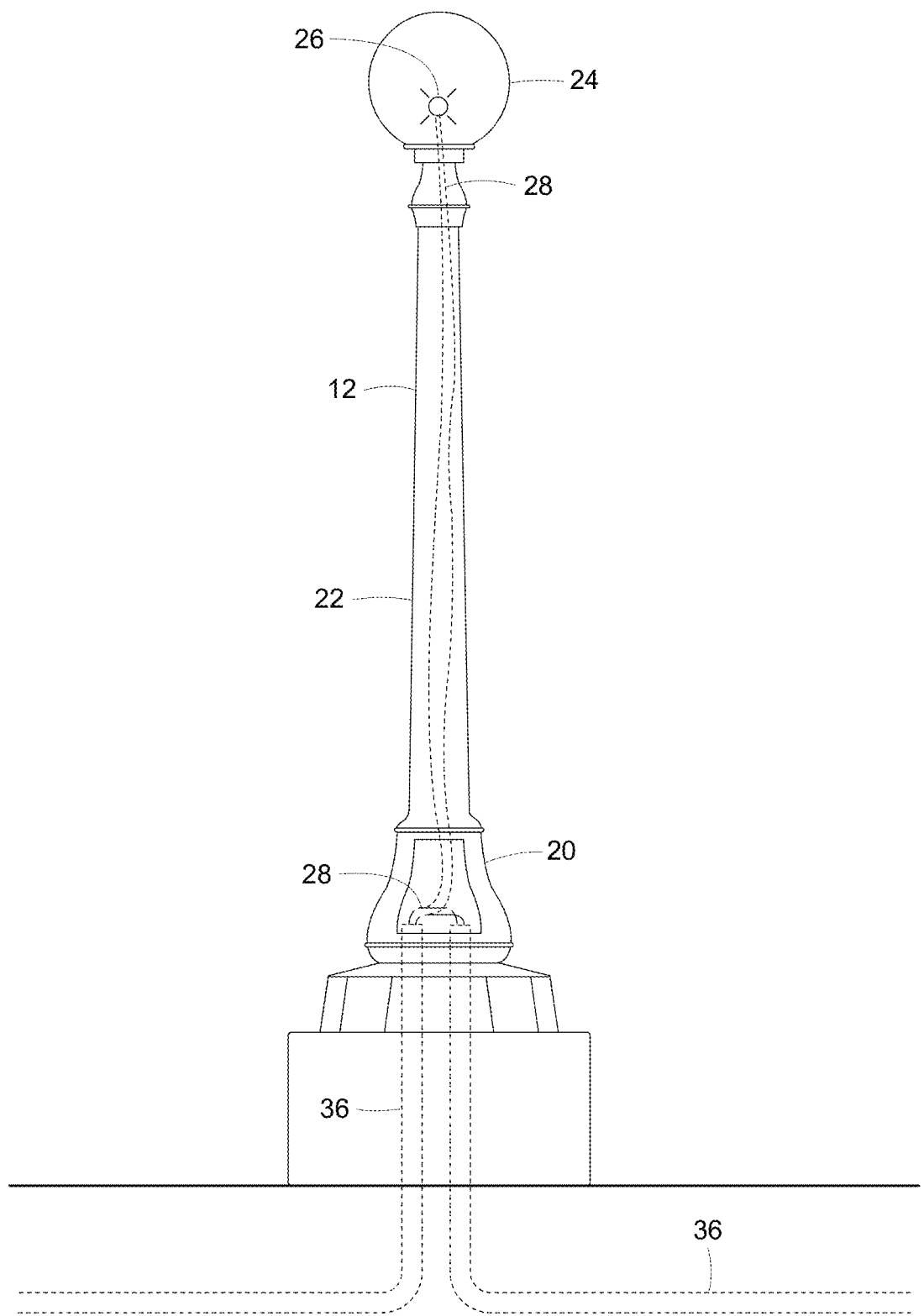
FIG. 3 is a front view similar to FIG. 2 but showing some example wiring and conduit.
Figure 4:
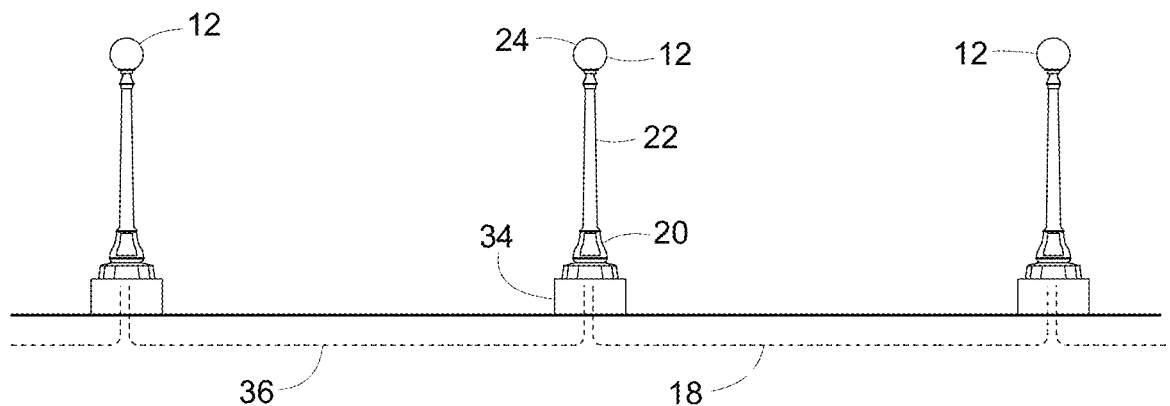
FIG. 4 is a front view of a series of example streetlights.
Figure 5:
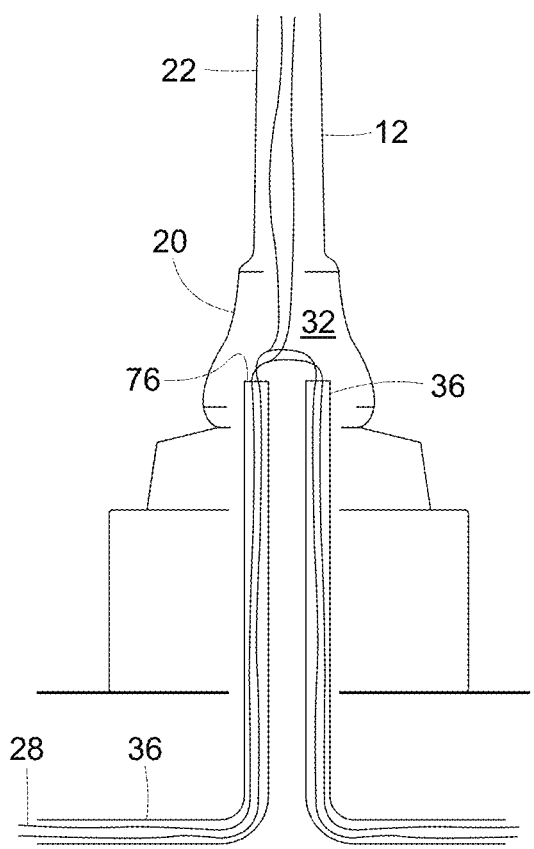
FIG. 5 is a cross-sectional front view of a lower section of the streetlight shown in FIG. 1.

While the disclosure is amendable to various modifications and alternative forms, specifics thereof have been shown by way of example in the drawings and will be described in detail. It should be understood, however, that the intention is not to limit the disclosure to the particular illustrative embodiments described herein. On the contrary, the intention is to cover all modifications, equivalents, and alternatives falling within the spirit and scope of the disclosure.

DESCRIPTION

The following description should be read with reference to the drawings wherein like reference numerals indicate like elements throughout the several views. The description and drawings show several examples that are meant to be illustrative of the disclosure.

FIGS. 1-24 illustrate various apparatuses and methods for thwarting the theft of wires and/or other internal components of streetlights. With respect to FIG. 1, and in some examples, streetlight 12 includes a hollow base 20, a tubular pole 22 extending upward from base 20, a light fixture 24 on top of pole 22, a lamp 26 (e.g., incandescent bulb, halogen bulb, LED, etc.) in light fixture 24, and at least one electrical wire 28 leading to lamp 26. Examples of wire 28 include one or more insulated "hot" wires, one or more insulated neutral wires, and one or more insulated or non-insulated ground wires. Some examples of base 20 include a cover plate 30 that can be removed for accessing a chamber 32 inside of base 20. For support, some examples of base 20 are anchored to a concrete foundation 34. In some examples, some parts of wire 28 extend through a conduit 36. Some sections of conduit 36 can be buried underground, and other sections can extend up into chamber 32 of base 20. In some examples, wire 28 includes multiple interconnected wire segments that may vary in length and wire gauge, and the actual wiring configuration can differ from what is shown in the drawings.

Figure 6:
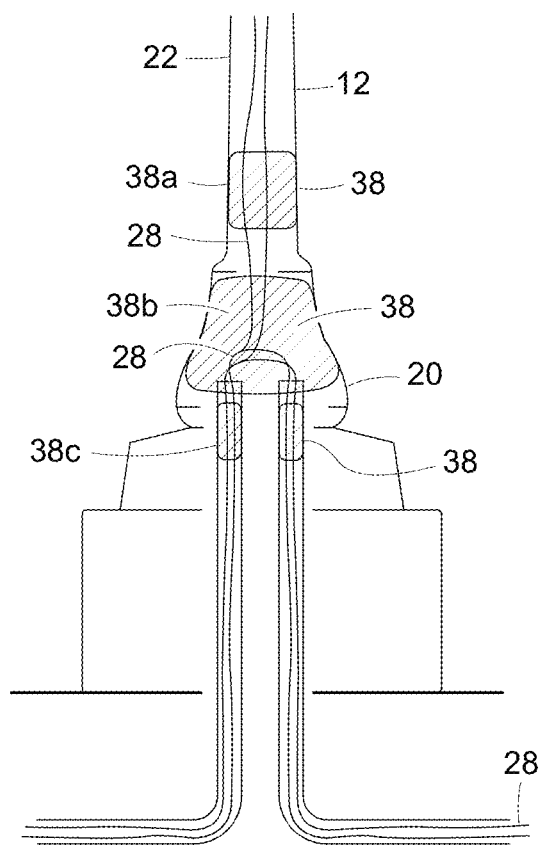
FIG. 6 is a cross-sectional front view similar to FIG. 5 but showing the streetlight after being modified.

FIGS. 2-5 show streetlight 12 prior to being modified by the present disclosure. FIG. 6 shows one or more plugs 38 (e.g. plugs 38a, 38b and 38c) having been inserted to inhibit the tampering or theft of wire 28 and/or other internal components in pole 22, base 20 and/or conduit 36. Some examples of plug 38 include expanded foam (e.g., GREAT STUFF by DuPont or 3M products such as AUTOMIX and 8458 foam), epoxy 40 (FIGS. 16-24), a mechanical obstruction, and/or various combinations thereof.

Figure 7:
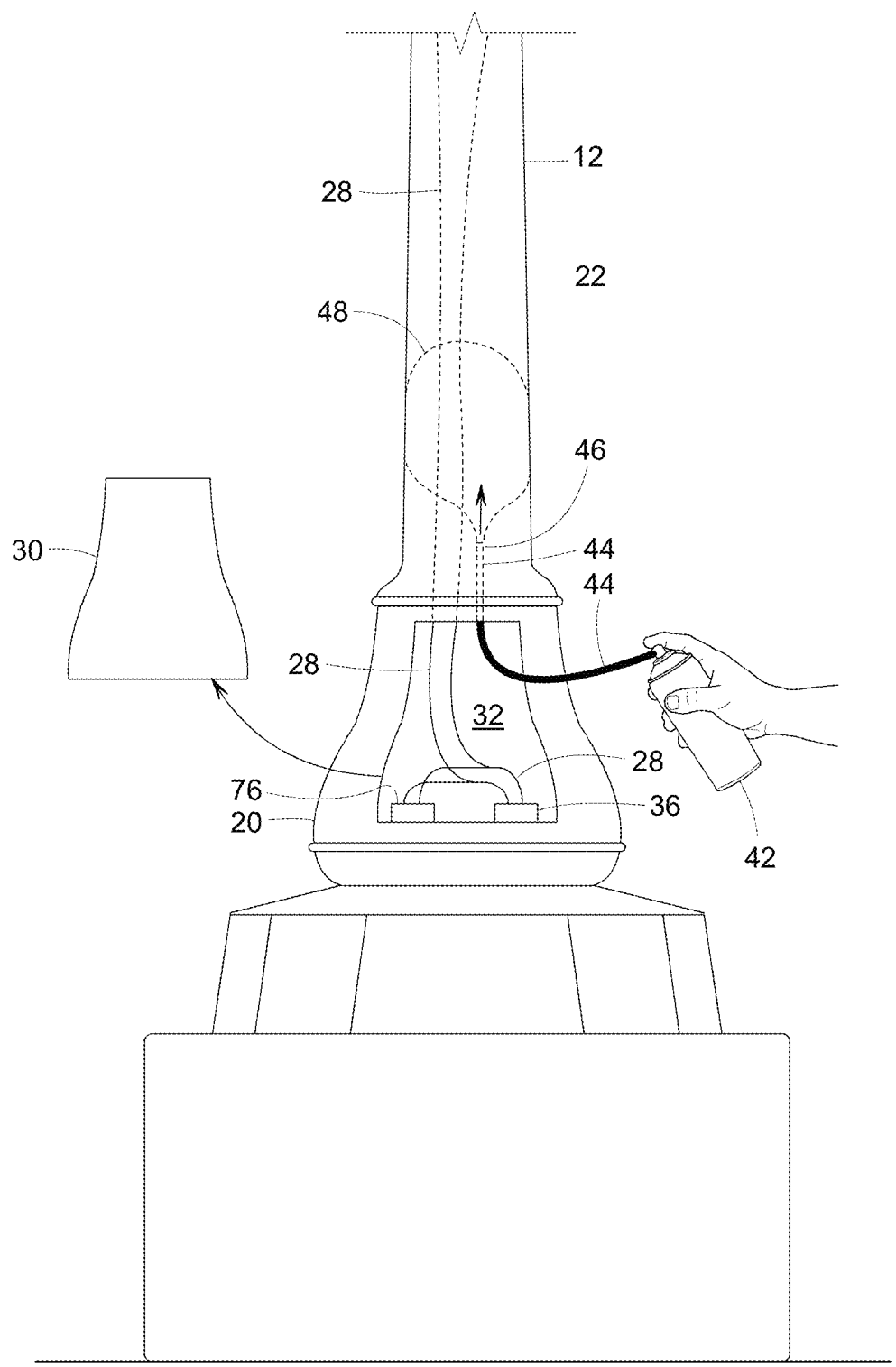
FIG. 7 is a front view of the streetlight being modified.

FIG. 7 shows an example means for creating plug 38. In the illustrated example, cover plate 30 is removed and a pressurized can 42 (or other foam source) and curved wand 44 with a discharge nozzle 46 inject expanding foam 48 into pole 22, base 20 and/or conduit 36. When expanded, the foam sets (e.g. solidifies) to create a plug 38. Plug 38 at least partially surrounds wire 28. This makes it more difficult for thieves to steal wire 28.

Figure 8:
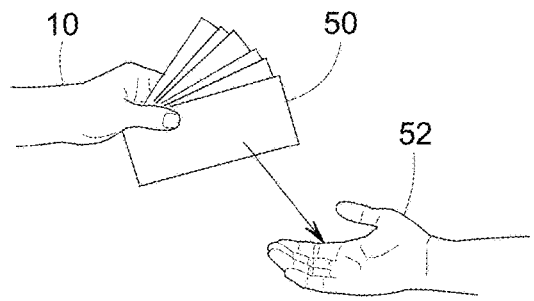
FIG. 8 is a perspective view of an example sponsor paying an example entity to help cover the cost of maintaining a streetlight.

FIG. 8 shows an illustrative sponsorship program. In this example, sponsor 10 pays a sponsorship fee 50 to help cover the cost of modifying streetlight 12 and/or covering at least some maintenance cost of one or more streetlights 12. In some examples, the sponsorship fee 50 includes a plurality of payments (e.g., six bills as shown in FIG. 8) distributed over a predetermined period 16 (e.g., three years). In some examples, the length of the predetermined period 16 is based on the amount of the sponsorship fee 50.

In some examples, an entity 52 receiving the sponsorship fee 50 attaches a notification 14 to streetlight 12, wherein the notification 14 provides recognition 54 of sponsor 10. Some examples of recognition 54 include the name of sponsor 10, a QR code 54a associated with sponsor 10, a website address of sponsor 10, a telephone number of sponsor 10, a picture of sponsor 10, etc. Some examples of entity 52 (that receives sponsorship fee 50) include a municipality, a land property owner, an individual, an organization, etc.

Figure 9:
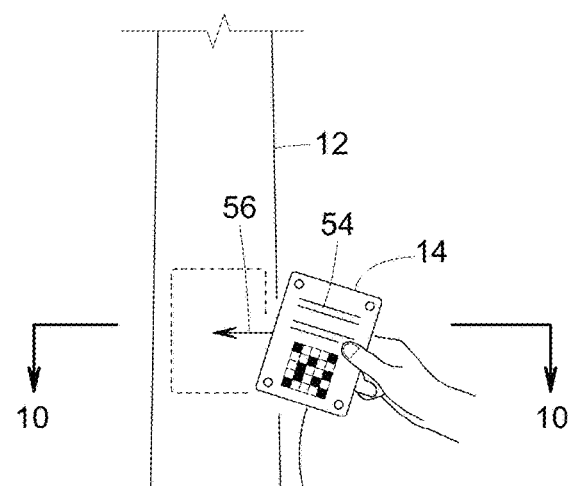
FIG. 9 is a front view of a streetlight being modified.
Figure 10:
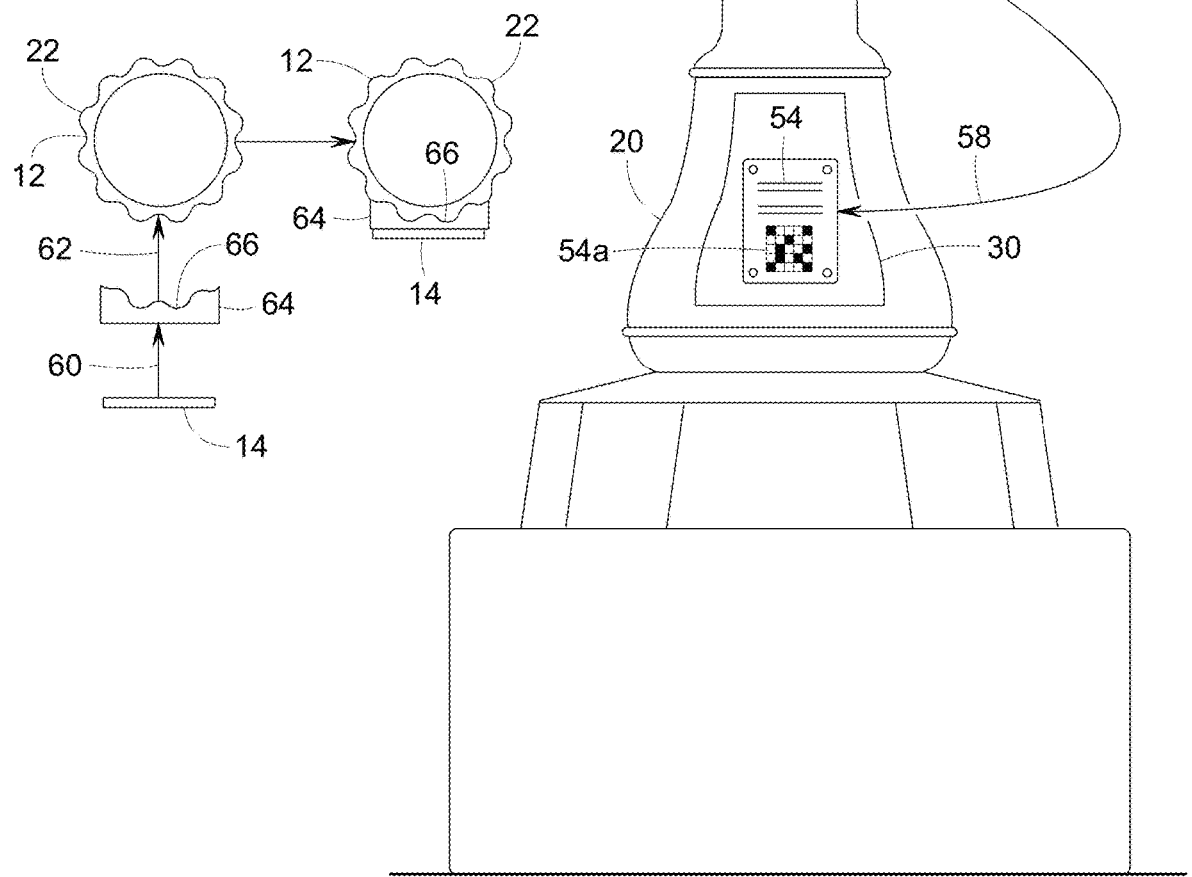
FIG. 10. is a cross-sectional view taken along line 10-10 of FIG. 9.
Figure 11:
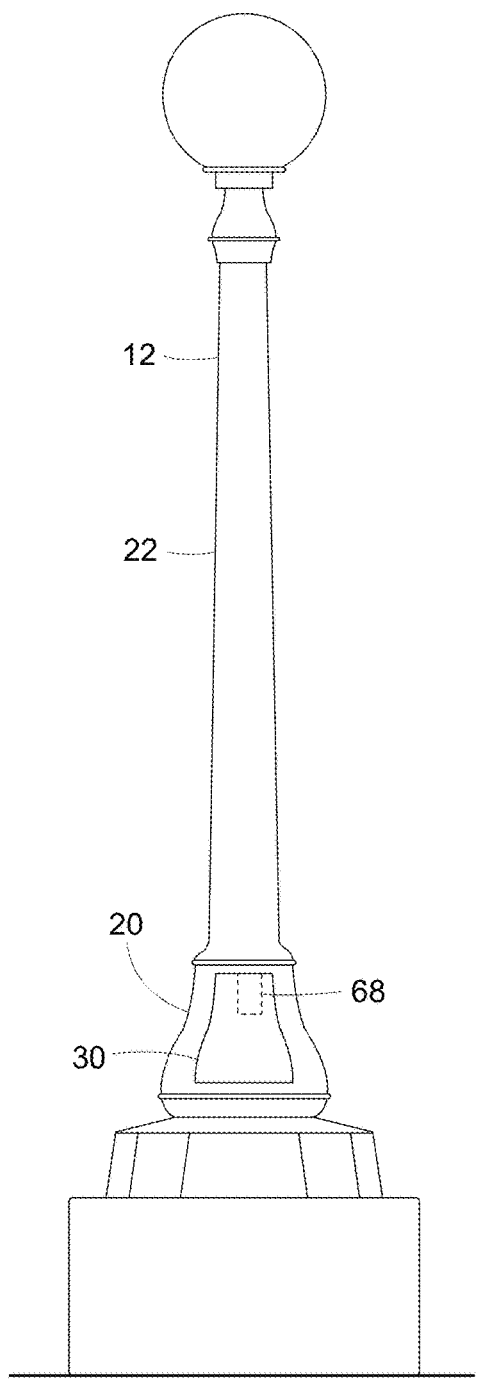
FIG. 11 is a front view of an example modified streetlight.
Figure 12:
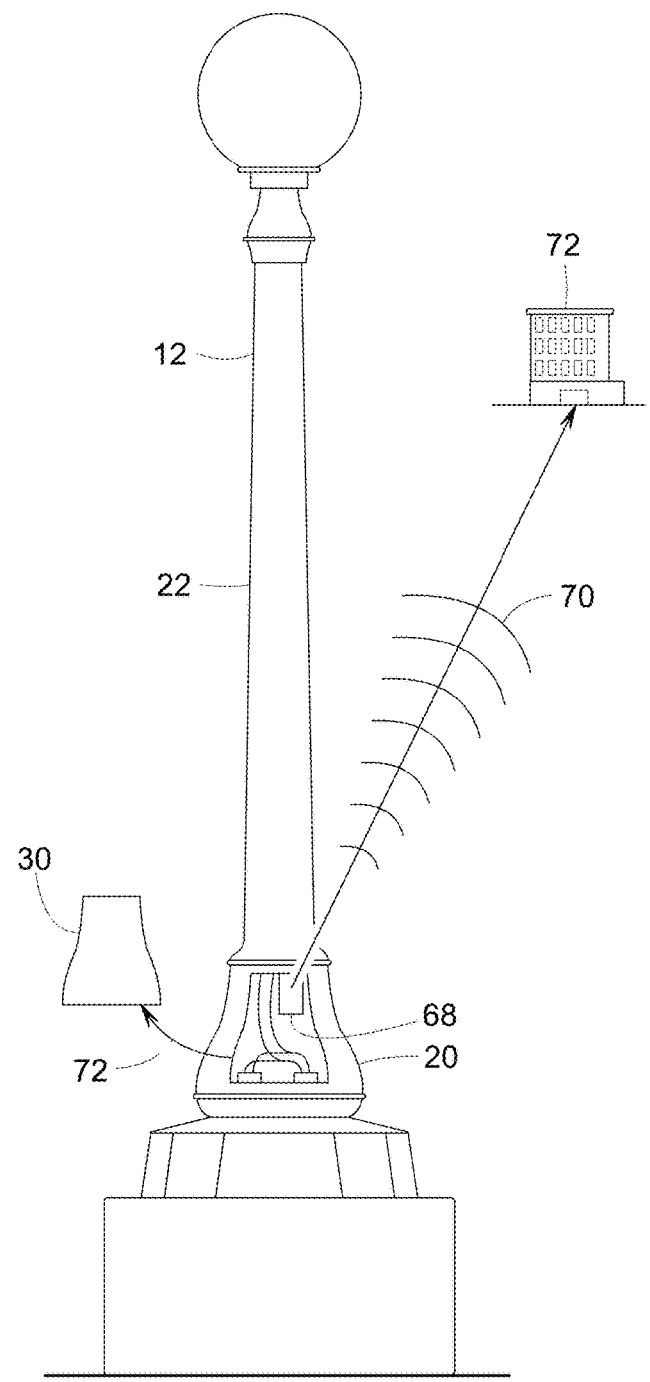
FIG. 12 is a front view similar to FIG. 11 but with a cover plate being removed from the streetlight and an example sensor emitting an alarm signal.

Arrows 56 and 58 of FIG. 9 and arrows 60 and 62 of FIG. 10 represent examples of attaching notification 14 to streetlight 12. In some examples, an adaptor 64 with a contoured surface 66 matching the contour of pole 22 or cover plate 30 helps fit a generally flat notification 14 to streetlight 12.

FIG. 1 shows a sponsor 10 (e.g., an individual, a group, a family, a Scout troop, an organization, etc.) supporting the maintenance of an example streetlight 12. A notification 14 (sign, plaque, sticker, label, etc.) provides recognition of sponsor 10, which has paid to help cover the cost of maintaining or repairing one or more streetlights 12 over a predetermined period of time 16 (e.g. 1 year).

In some examples, as shown in FIGS. 11-15, a sensor 68 is added to streetlight 12. In some cases, sensor 68 provides an alarm signal 70 in response to someone possibly tampering with streetlight 12. In some examples, alarm signal 70 is transmitted to a remote location 72 (e.g., police department, city street department, sponsor 10, etc.). The term, "remote" means external to the streetlight 12 and at least 10 feet away. In some examples, alarm signal 70 is transmitted by electromagnetic radiation (e.g., radio signal such as a cellphone signal (3G, 4G, 5G), BLE, WiFi, a mesh network, etc.). In some examples, alarm signal 70 may be transmitted over a wired network. In some cases, alarm signal 70 may be transmitted over power lines 28 via Power Line Communication (PLC). In some cases, the sensor 68 may be powered by power supplied over wires 28. In some cases, the sensor 68 may be powered by batteries. In some cases, the sensor 68 may be powered by power received over wires 28 with backup power provided by batteries.

In some cases, the sensor 68 may cause an audible alarm in response to someone possibly tampering with streetlight 12. In some cases, the sensor 68 may cause a visual alarm in response to someone possibly tampering with streetlight 12.

In some cases, the sensor 68 may cause a visual alarm by temporarily interrupt power to the lamp 26 of the streetlight in a predetermined pattern, causing the lamp 26 to flash on and off at a predetermined period and duty cycle. In some cases, temporarily interrupting power to the lamp 26 in a predetermined pattern produces a detectable signal on the wires 28, which can be detected by a monitoring station remote from the streetlight 12 and reported to an entity overseeing the maintenance/security of the streetlights 12. In some cases, neighboring streetlights may detect the detectable signal on the wires 28 and in response temporarily interrupt power to their lamps in a predetermined pattern, causing the neighboring streetlights to also flash on and off. These are just examples.

In some cases, the sensor 68 may include a deployable payload that can be deployed by the sensor 68 in response to detecting someone tampering with the streetlight 12. For example, the sensor 68 may deploy a payload of expandable foam to form a plug about the wires 28 in response to detecting someone tampering with the streetlight 12. In another example, the sensor may deploy an exploding ink tag that when deployed disperses a permanent ink that covers the thief, wires 28 and/or other internal components that the police, security personnel and/or wire salvage yards will recognize as associated with theft. It is contemplated that the deployment of the payload by the sensor 68 may be disabled by an authorized maintenance worker, such as by providing a valid security code to the sensor 68 (e.g. via a Bluetooth connected cell phone, a keypad, and/or in any other suitable manner).

Some examples of sensor 68 include a light sensor that detects sunlight or a flashlight when cover plate 30 is removed (arrow 72 of FIG. 12), a limit switch with a spring-loaded button 74 (FIG. 15) that detects the removal of cover plate 30, a Hall Effect or motion sensor (e.g. accelerometer, gyroscope) that detects the removal of cover plate 30 and/or hammering on the streetlight, and a microphone responsive to a sound characteristic of hammering or breaking. These are just examples.

Figure 13:
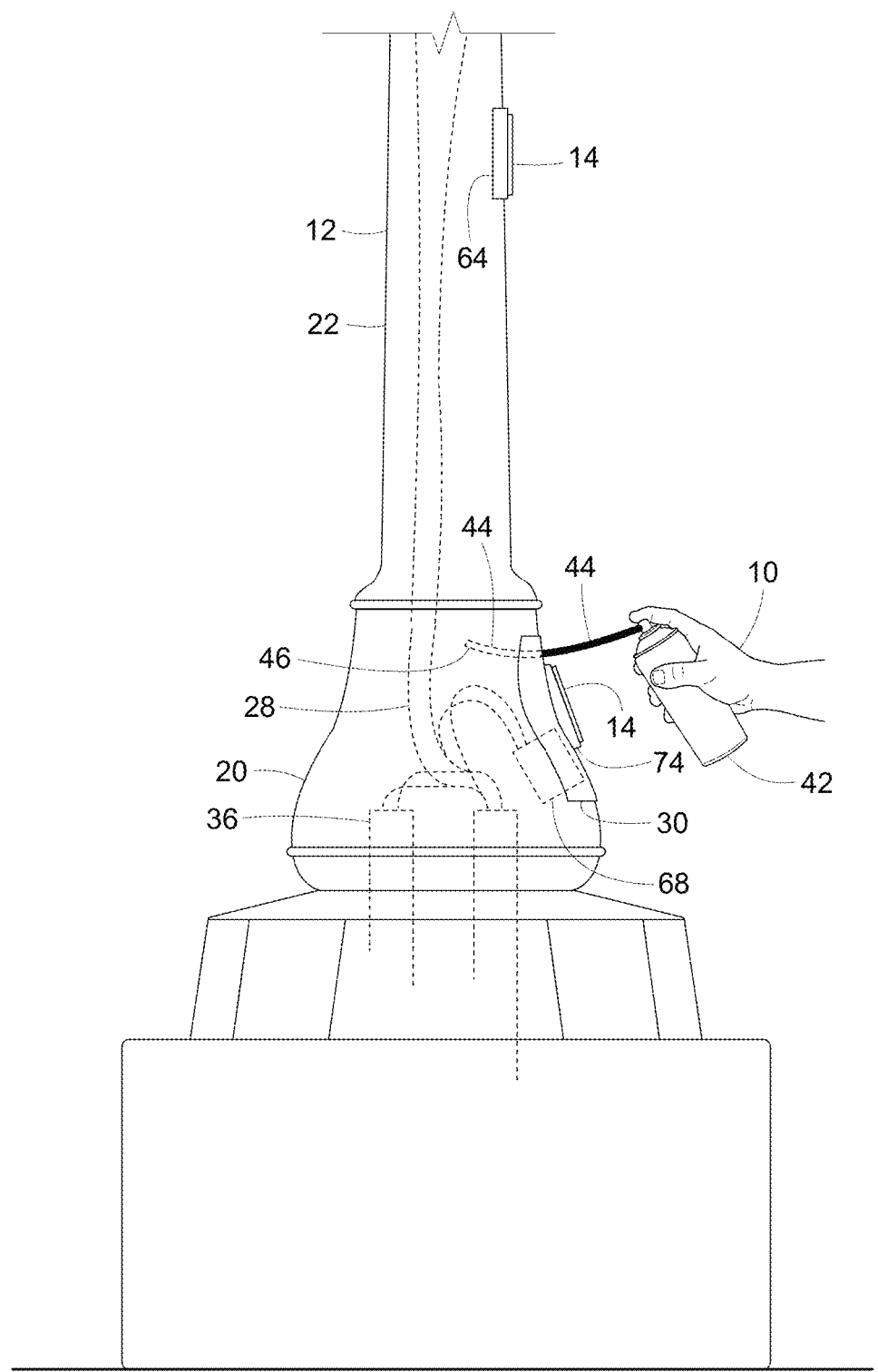
FIG. 13 is a left side view of an example streetlight being modified.
Figure 14:
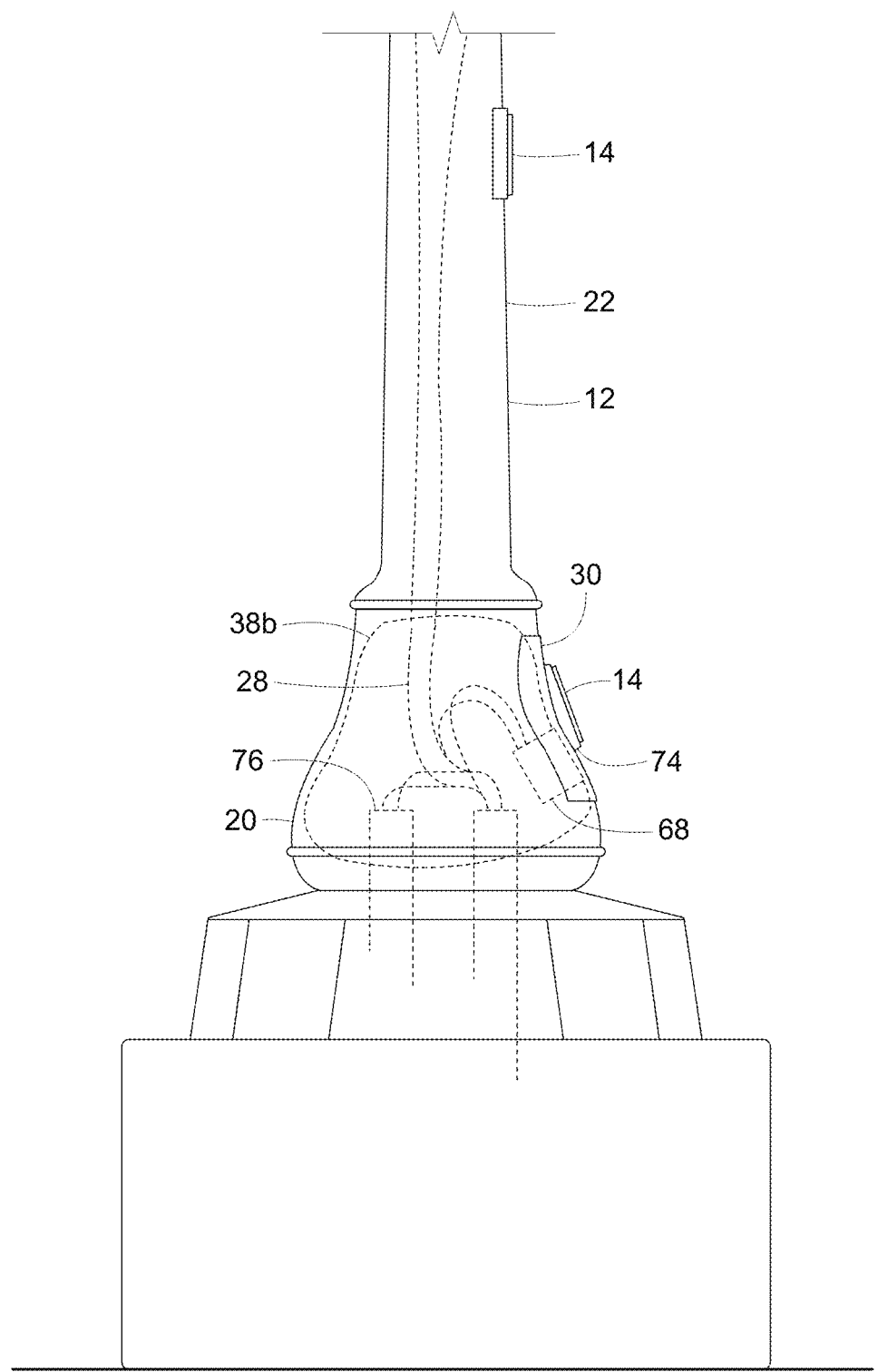
FIG. 14 is a left side view similar to FIG. 13 but showing the streetlight after it is modified.
Figure 15:
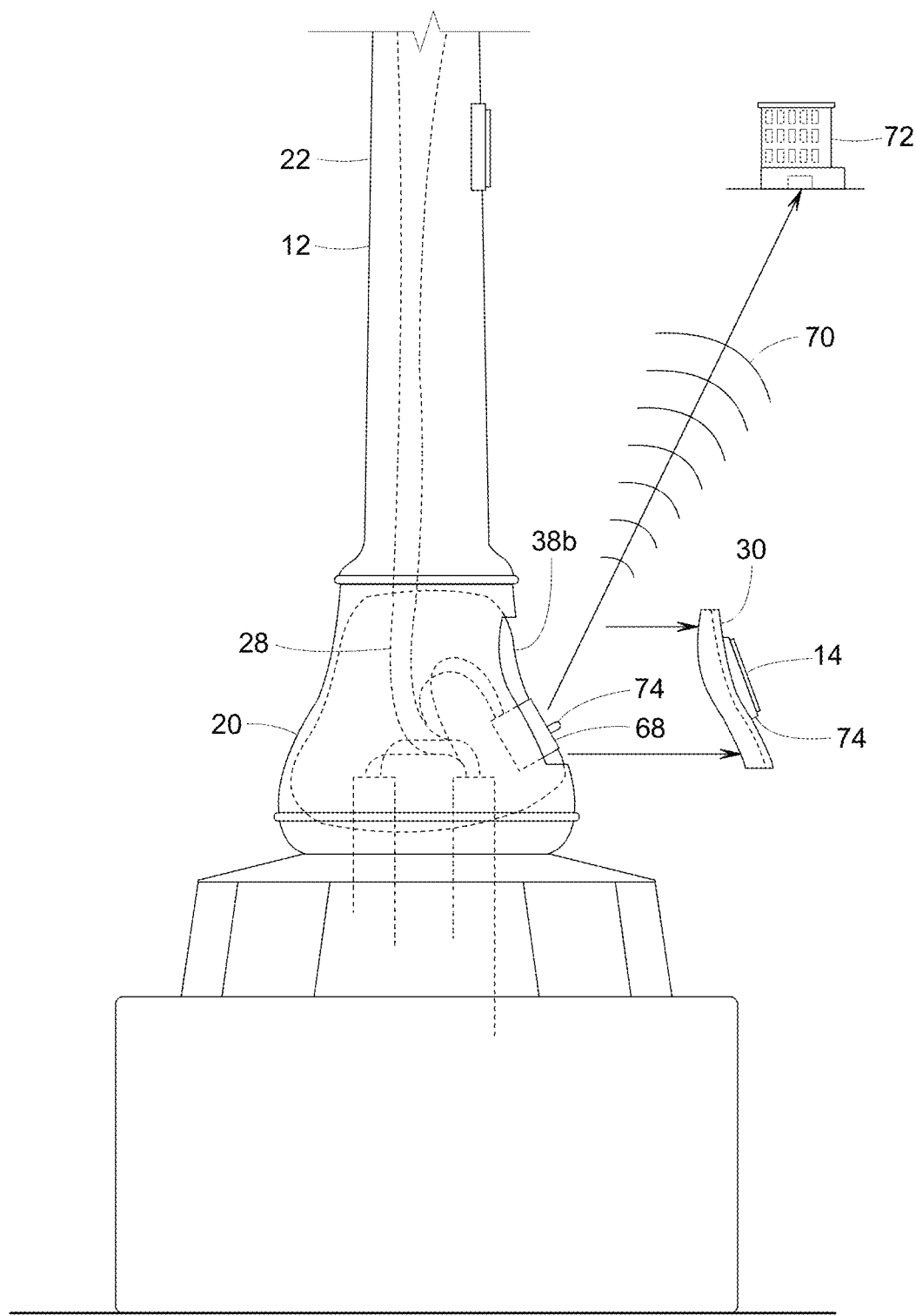
FIG. 15 is a left side view similar to FIG. 15 but showing the cover plate being removed and the sensor emitting an alarm signal.

FIGS. 13-15 show one example method of installing sensor 68 and filling base 20 with plug 38 in the form of expanding foam. In this example, a non-hardening putty, screws or magnets hold sensor 68 up against a backside of cover plate 30. In this example, wand 44 is inserted through a small hole in cover plate 30 to inject expanding foam 48 into chamber 32 while cover plate 30 remains attached to base 20, as shown in FIG. 13. FIG. 14 shows the foam having set (e.g. solidified) to form plug 38*b*. Plug 38*b* fills most of chamber 32 and partially surrounds and bonds to sensor 68. If cover plate 30 is then later removed and pulled away from sensor 68, as shown in FIG. 15, sensor 68 detects outdoor ambient light or spring loaded button 74 extends in response to the separation of cover plate 30 from sensor 68. In either case, sensor 68 emits alarm signal 70 in response to cover plate 30 being removed.

In another example, the foam is not injected by wand 44 as shown in FIG. 13. Instead, the sensor 68 includes a payload of an anti-theft material such as an expandable foam or a permanent ink in an unsolidified state. In response to the sensor 68 detecting a condition that corresponds to someone tampering with the streetlight 12, the sensor 68 then causes the dispersing of the anti-theft material in at least part of the interior space of the base, the interior space of the tubular pole and/or the interior space of the conduit. Once the anti-theft material solidifies, the anti-theft material provides a deterrent to stealing one or more internal components of the streetlight.

The condition that corresponds to someone tampering with the streetlight may include, for example: removal of the cover plate that is removably attached to the streetlight to access the interior space of the base, the interior space of the tubular pole and/or the interior space of the conduit; a predetermined motion profile of at least part of the streetlight, such as a motion profile that indicates someone is hammering on the streetlight; a predetermined electrical profile of electrical signals on one or more of the plurality of wires, such as power no longer being delivered to the streetlight; a predetermined temperature change profile of at least part of the streetlight, such as a temperature change inside of the streetlight caused by the removal of the cover plate; a predetermined sound profile, such as a sound profile that corresponds to hammering and/or drilling on the streetlight; and a predetermined light profile, such as a change in ambient light inside of the streetlight caused by the removal of the cover plate. These are just examples.

In some examples, cover plate 30 is made mostly of plastic or some other material that is different than the metal of base 20. Plastic provides several benefits over a cover plate made of cast iron. One, plastic can be 3D printed or cast in acrylic using an inexpensive silicon mold made from the original cast iron cover plate 30. Two, plastic is weaker than iron, so if a vandal hammers on cover plate 30, the plastic material will likely breakaway before the more expensive iron base 20 can break. Three, a 3D printed or cast acrylic cover plate 30 can include an integral flat boss 74 for readily attaching notification 14. Four, a cover plate 30 if cast in clear acrylic would provide a window into chamber 32 to show the wires 28 inside are tamperproof, plus curious others might find it interesting just to see what's inside base 20.

Figure 16:
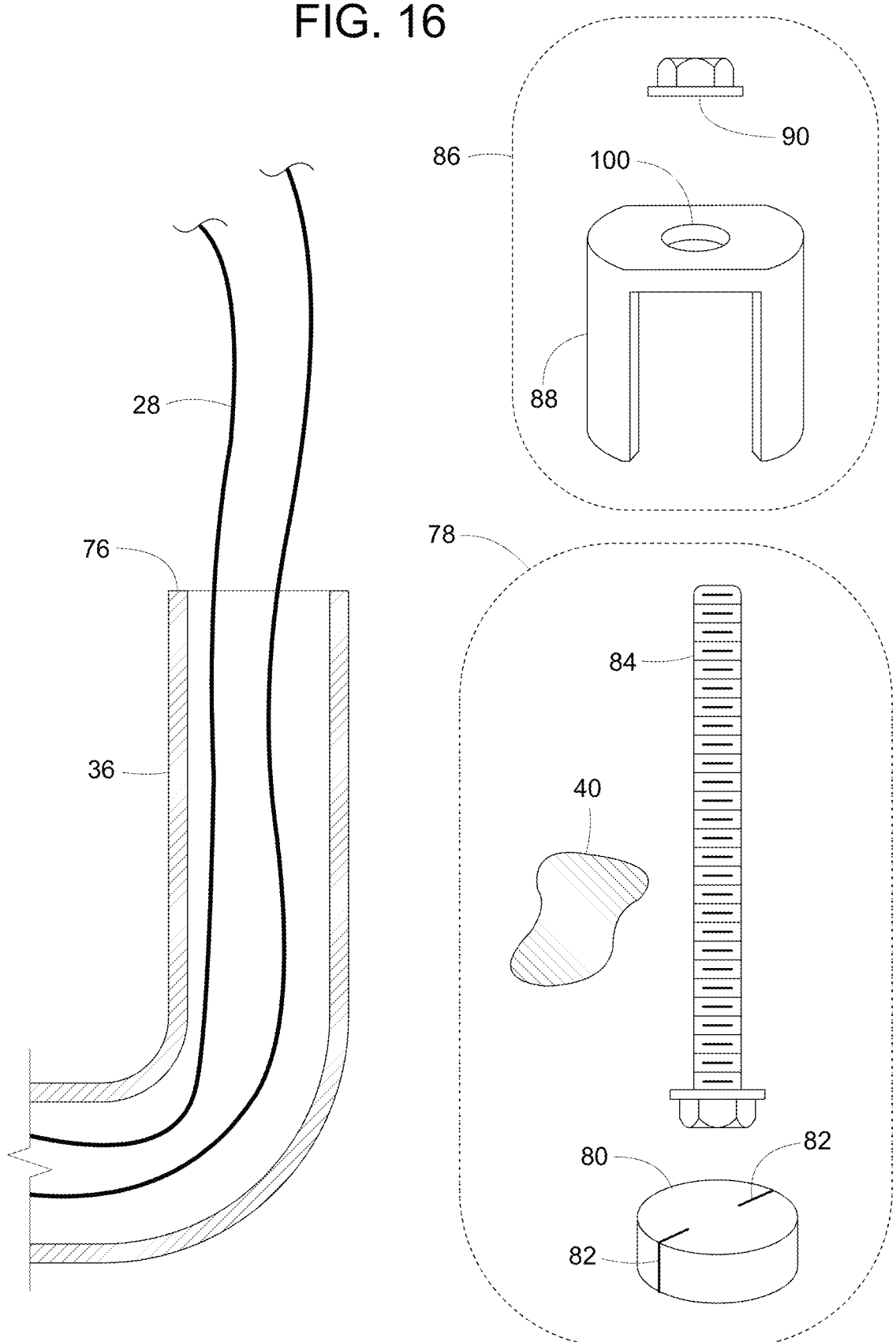
FIG. 16 is a collection of views showing an unmodified conduit of the streetlight, parts for plugging the conduit, and a set of tools for removing the plug.

FIGS. 16-24 show example structures and methods associated with plug 38c. Plug 38c is used for affixing one or more wires 28 within conduit 36 in the area where an upper end 76 of conduit 36 extends into chamber 32 of base 20. FIG. 16 shows plug 38c including a set of parts 78. The set of parts 78 include a foam disk 80 with slits 82 through which wires 28 can pass, an odd bolt 84 (e.g., left handed threads, non-standard thread pitch, etc.), and a supply of epoxy 40. FIG. 16 also shows a set of plug removal tools 86. In this example, tools 86 include a standoff 88 and a nut 90 matching bolt 84.

One example method of using plug 38c involves creating an obstruction 92 on wire 28 to inhibit wire 28 from being pulled through plug 38c. Some examples of obstruction 92 include a knot 94 in wire 28, a knot 94 tying two wires 28 together, and/or a fastener 96 (e.g., a wire tie, a cable tie, a zip tie, etc.) on one or more wires 28.

Figure 17:
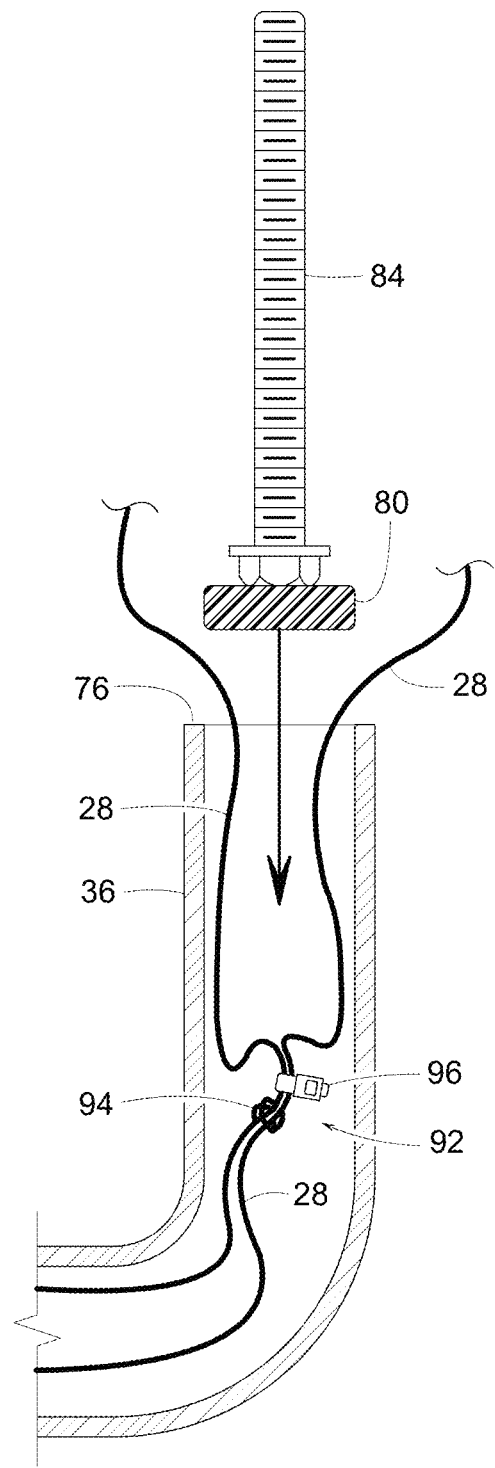
FIG. 17 is a cross-sectional view showing a method step for plugging a conduit.

FIG. 17 shows inserting disk 80 and bolt 84 down into the upper end 76 of conduit 36 such that wire 28 extends through slits 82. In some examples, the head of bolt 84 can be glued to disk 80.

Figure 18:
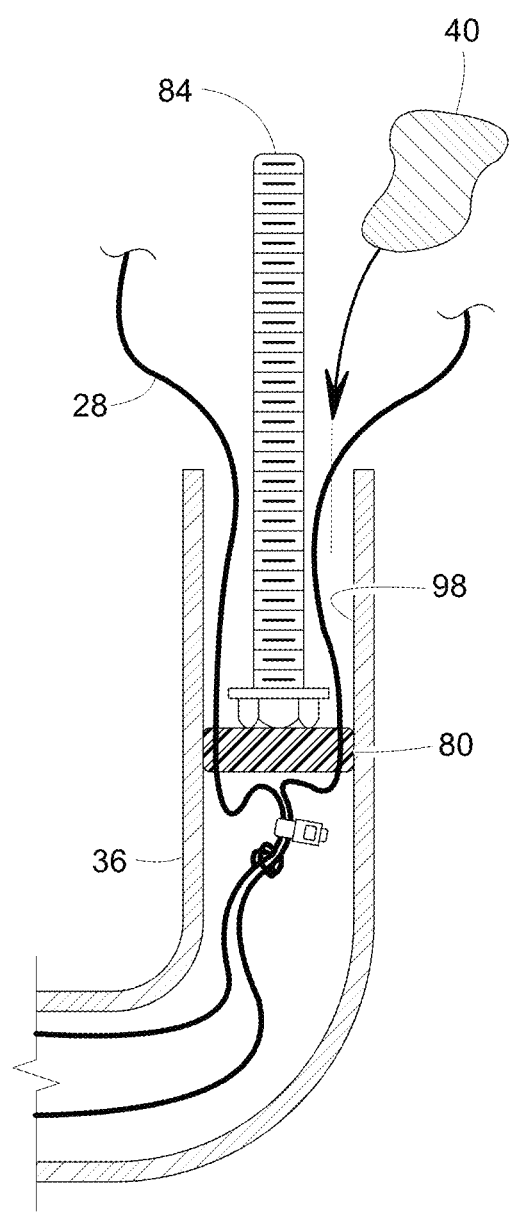
FIG. 18 is a cross-sectional view showing another method step for plugging a conduit.

FIG. 18 shows epoxy 40 being poured into conduit 36 to encapsulate wires 28 and the lower end of bolt 84 and to bond to an inner wall 98 of conduit 36. Disk 80 compressively seals radially against the inner wall 98 of conduit 36 to help prevent liquid epoxy 40 from draining too far down conduit 36.

FIG. 19 shows the epoxy 40 having hardened to create plug 38c. Plug 38c bonds bolt 84 to conduit 36 with sufficient strength to prevent wire 28 (with its limited tensile strength) from being able to pull plug 38c out from within conduit 36.

FIG. 20 shows an example method of removing plug 38c. In this example, standoff 88 is placed on the upper end 76 of conduit 36. Bolt 84 extends through a hole 100 in standoff 88, and nut 90 screws onto bolt 84. FIG. 21 shows standoff 88, bolt 84, and nut 90 configured to create a threaded plug puller 102 for removing plug 38c.

Bolt 84 and nut 90 being unconventional helps prevent a thief from readily using this method of removal. Standoff 88 and special nut 90 are, of course, made available to the entity overseeing the maintenance of the streetlights 12.

Figure 23:
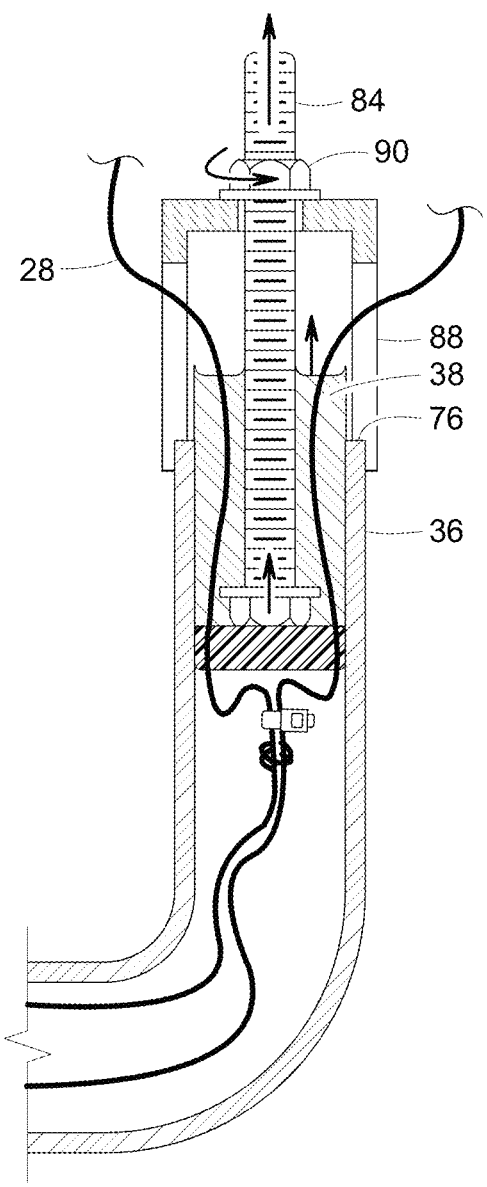
FIG. 23 is a cross-sectional view similar to FIG. 23 but showing the set of tools for removing the plug.
Figure 24:
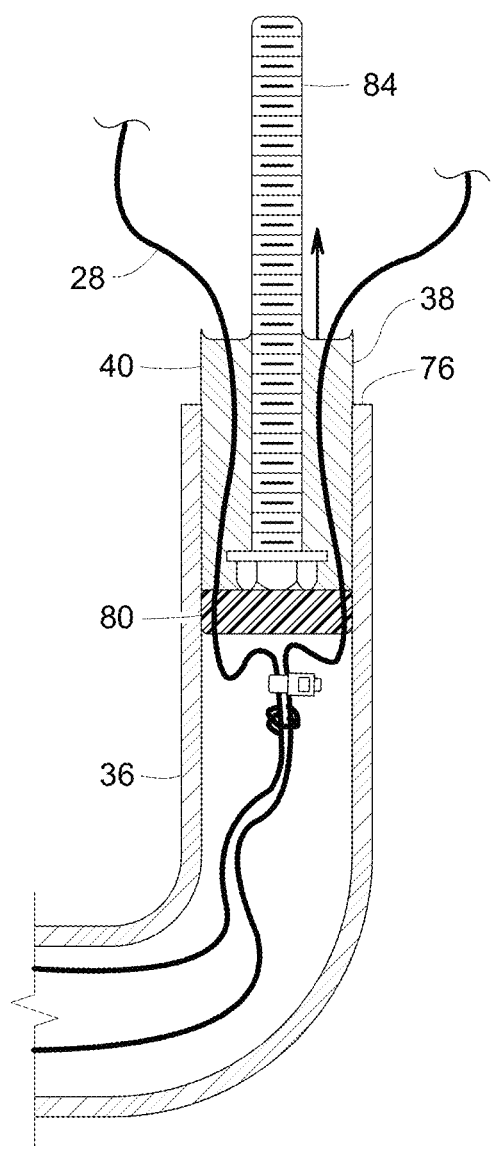
FIG. 24 is a cross-sectional view similar to FIG. 23 but with the set of tools removed and the plug being manually pulled out farther.

FIG. 22 shows nut 90 being turned to draw bolt 84 and plug 38c out from within conduit 36. Once plug 38c breaks loose of conduit 36, as shown in FIG. 23, bolt 84 and plug 38c can be manually pulled out completely without standoff 88 and nut 84, as shown in FIG. 24.

In a similar example, plug 38c is made mostly of metal instead of epoxy. Rather than using an adhesive bond between an epoxy version of plug 38c, a metal version of plug 38c can rely on a press-fit and/or include external threads or barbs that grip the inner wall 98 of conduit 36.

FIGS. 25-30 show another example structure and method for deterring theft of internal components (e.g., wires 28) of streetlight 12. In this example, a foam-expandable bag 104 is inserted in the base 20 of the streetlight 12. The bag 104 expands to fill much of the open space within base 20, thereby blocking access to the wires 28 and other internal components.

Figure 30:
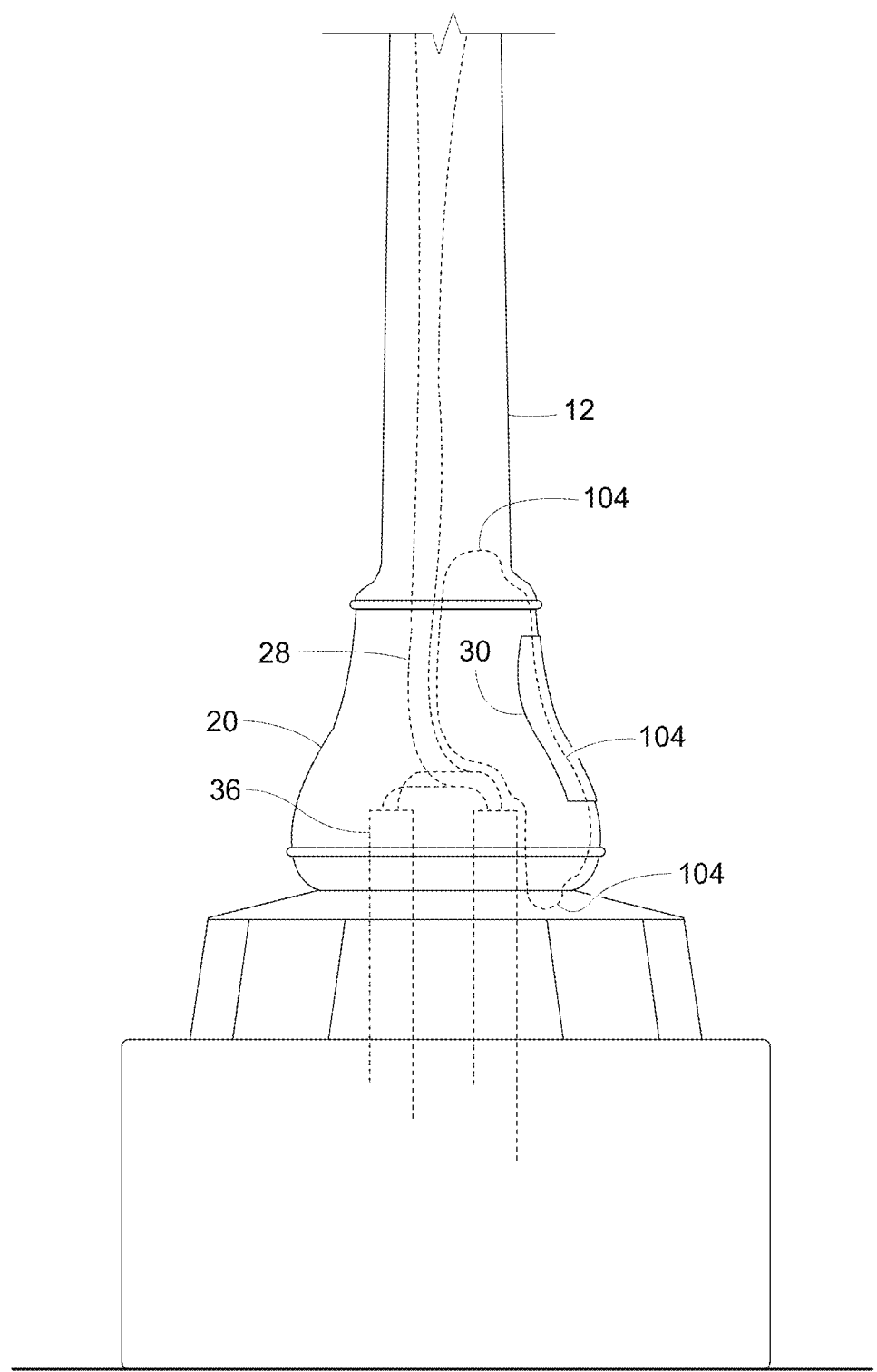
FIG. 30 is a left side view of a streetlight with its base partially filled with a foam-expandable bag.
Figure 31:
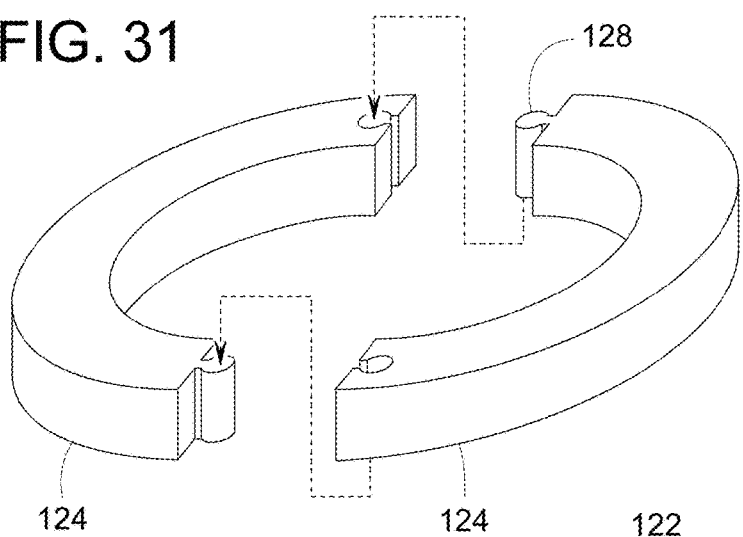
FIG. 31 is a perspective view of two example ring segments being assembled.
Figure 32:
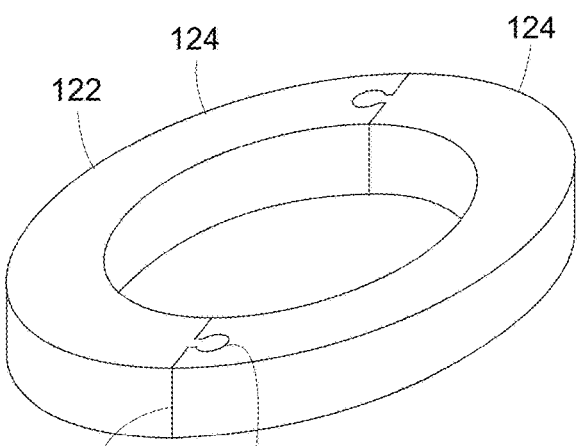
FIG. 32 is a perspective view showing the two ring segments assembled to create an example ring.
Figure 33:
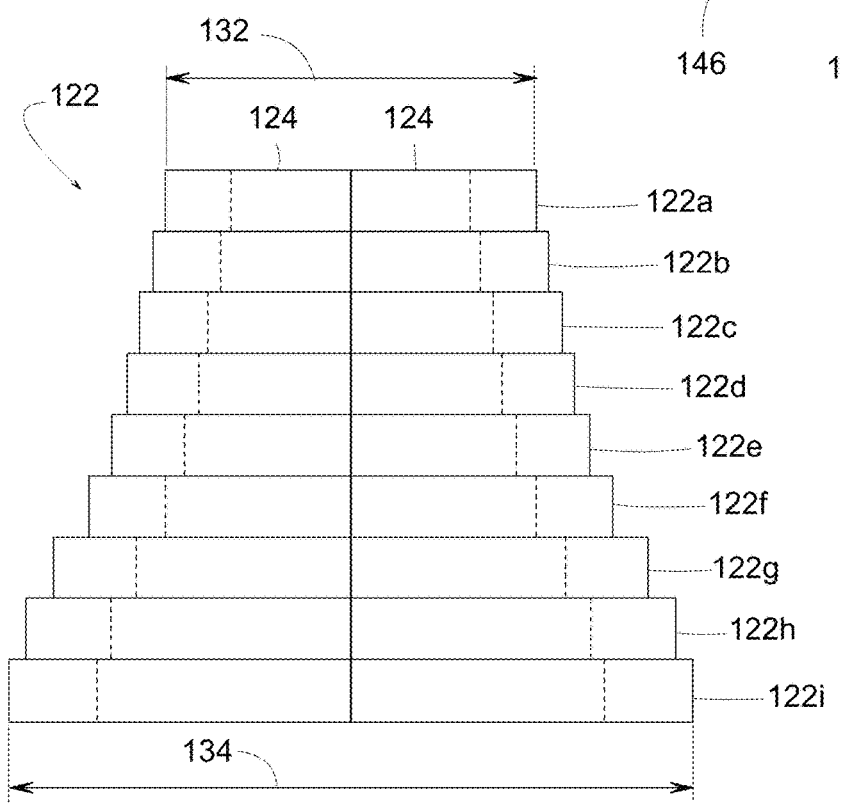
FIG. 33 is a front view of an example stack of rings.

In some examples, as shown in FIG. 30, the bag 104 primarily fills just the space between the wires 28 and the cover plate 30, so if a thief removes the cover plate 30, it will appear that the base's entire chamber 32 is filled with foam when actually the base 20 is only partially full. A partially filled base 20 can deter thieves yet allows authorized personnel to remove the bag 104 with some effort to service the streetlight 12 as needed. When the foam is contained in the bag 104 once expanded, the foam may not encapsulate the wires and/or other internal components of the streetlight 12, and thus can reduce the effort needed by service personnel to remove the foam to service the streetlight 12.

Figure 25:
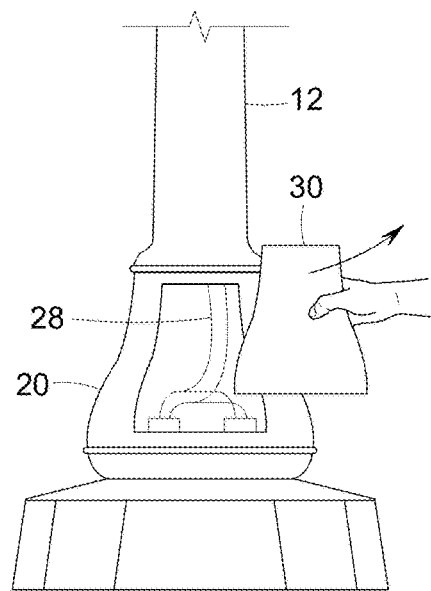
FIG. 25 is a front view showing an example cover plate being removed from the base of a streetlight.

FIG. 25 shows, in some examples, the process of at least partially filling the base 20 with foam begins by removing the cover plate 30 from the base 20. With the cover plate 30 removed, the foam-expandable bag 104 can be inserted into the base 20.

Figure 26:
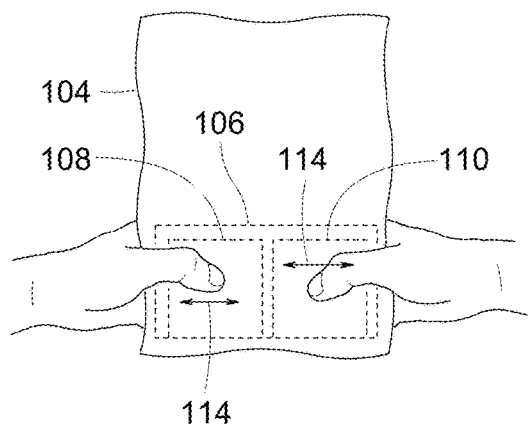
FIG. 26 shows a foam-expandable bag being activated by manual manipulation.
Figure 27:
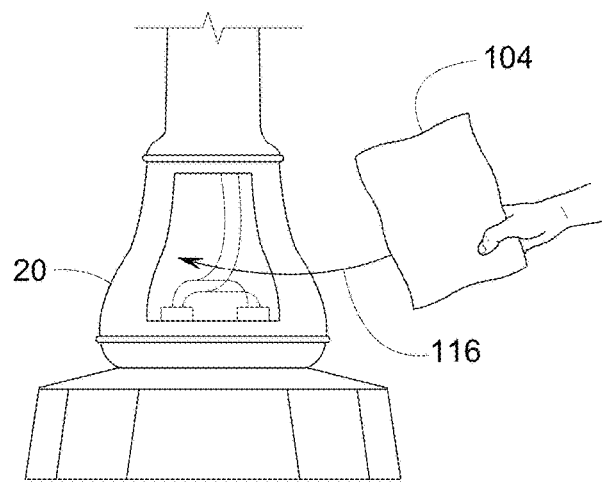
FIG. 27 is a front view showing the foam-expandable bag being inserted into the base of the streetlight.

FIG. 26 shows an example foam-expandable bag 104. Some examples of foam-expandable bag 104 are provided by the Sealed Air Corporation of Charlotte, North Carolina. Some examples of the foam-expandable bag 104 are described in U.S. Pat. Nos. 5,899,325 and 6,712,201, both of which are incorporated herein by reference. Some examples of the foam-expandable bag 104 are known by various names such as, Instapack, Quick RT, Sealed Air Instapak Quick Room Temperature Foam Packaging, foam-in-bag systems, and variations and combinations thereof. These are just examples.

In the illustrated example, foam-expandable bag 104 includes an internal pouch 106 with two chambers 108 and 110. Chambers 108 and 110 are divided and hermetically sealed by a frangible seal between the two chambers 108 and 110. In some examples, chamber 108 contains a part-A component (e.g., isocyanate), and chamber 110 contains a part-B component (e.g., polyol).

The foam-expandable bag 104 can be activated by manual manipulation. Arrows 114 represent manually manipulating (e.g., pressing, patting, kneading, etc.) the foam-expandable bag 104 to break the frangible seal between the two chambers 108 and 110, thereby allowing the part-A and part-B components to intermix. The resulting mixture of part-A and part-B chemically reacts and expands as foam (e.g., polyurethane foam) that can spread throughout the bag 104.

Figure 28:
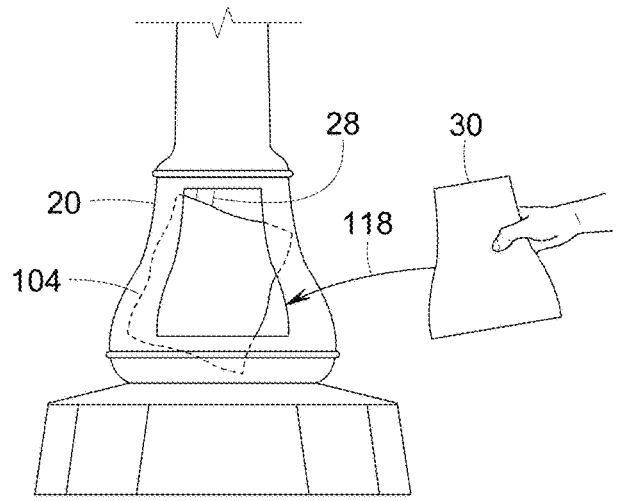
FIG. 28 is a front view showing the cover plate being reattached to the base while the foam-expandable bag expands.
Figure 29:
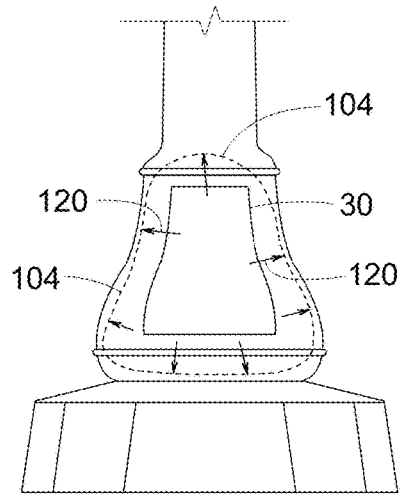
FIG. 29 is a front view showing the foam-expandable bag continuing to expand while the cover plate is attached to the base.

Before fully expanding, however, the foam-expandable bag 104 is quickly inserted in the base 20 (represented by arrow 116 of FIG. 27), and the cover plate 30 is held in place on the base 20 (represented by arrow 118 of FIG. 28). Arrows 120 of FIG. 29 represents the bag 104 continuing to expand within the base 20 while the cover plate 30 held in place.

After fully expanding, the foam in the bag 104 will set to at least a partially hardened state. The expanded, hardened foam makes it difficult to readily access the wires 28 and other internal components of the streetlight 12. With appreciable effort, however, the expanded bag 104 can be forcefully removed by service personnel to service the streetlight 12 if necessary.

FIGS. 31-51 show another example structure and method for deterring theft of internal components (e.g., wires 28) of the streetlight 12. In this example, a stack of rings 122 (i.e., a plurality of rings 122*a-i* in an axially stacked arrangement) are inserted in the base 20 of the streetlight 12. The stack of rings 122 may be of any number of rings 122 to fit the size of the base 20. When installed, the stack or rings 122 encircles the wires 28 within the base 20. The stack of rings 122 are made of a tough material to provide a protective barrier that inhibits thieves from easily stealing the wires 28. While the rings 122 are shown as defining a round outer perimeter shape, it is contemplated that the outer perimeter shape of the rings 122 may be square, rectangular, octagonal, hexagonal or any other suitable shape. Likewise, while the rings 122 are shown as defining a round inner perimeter shape, it is contemplated that the inner perimeter shape of the rings 122 may be square, rectangular, octagonal, hexagonal or any other suitable shape.

The stack of rings 122 is an assembly of rings that can be installed individually within the base 20. In some examples, each ring 122 comprises two or more ring segments 124, which can readily fit through the base's access opening 126, while a full ring 122 might be too large to pass through the access opening 126. The ring segments 124 also allow each ring 122 to be assembled around the wires 28 without having to first disconnect any of the wires 28. In some examples, the ring segments 124 include an interlocking shape 128, so the ring segments 124 can be securely interconnected circumferentially.

In some examples, the ring segments 124 are made of a durable plastic. Some example ring segment materials include polyurethane and polycarbonate. Other example ring segment materials include rubber, neoprene, UHMW (ulta high molecular weight polyethylene), wood, metal, cement, concrete, stone, fiberglass, etc. In some examples, the ring segments 124 include a metal reinforcement embedded within the ring segment 124 or attached to its surface. In some cases, a metal ring (formed from one or more metal ring segments) may be interposed between two polymer rings. In some cases, a metal ring may be provided between every "nth" polymer ring, wherein N is an integer greater than zero. The rings and ring segments may be secured together using an adhesive, heat welding, or in any other suitable way.

Figure 34:
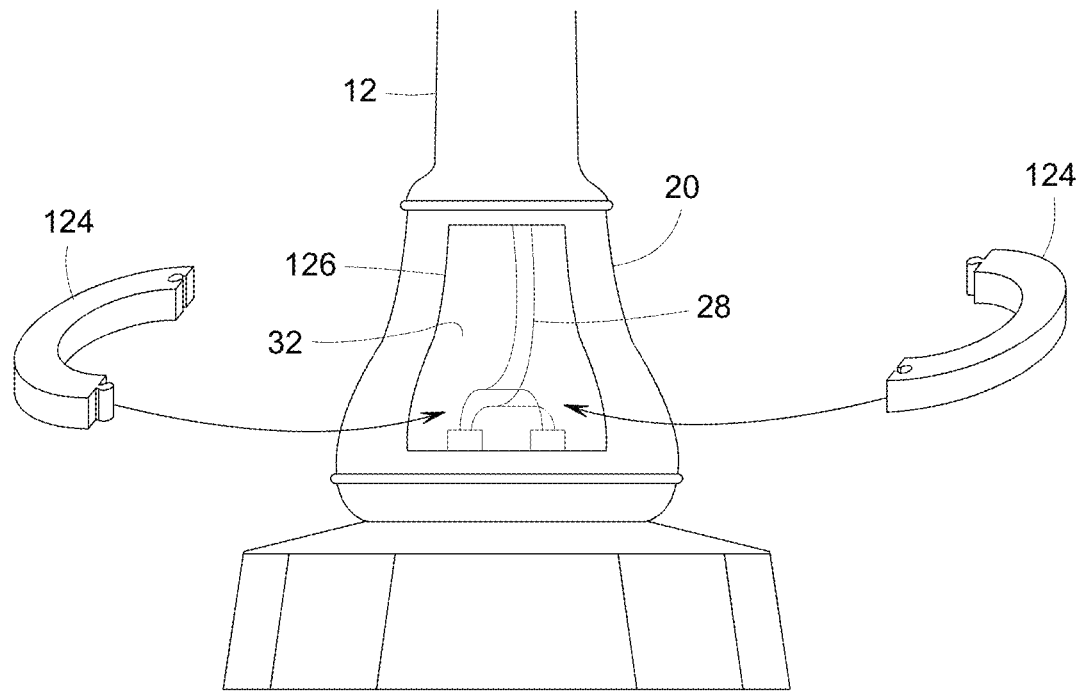
FIG. 34 is a front view showing one method step of assembling and installing the stack of rings with the base of the streetlight.

FIGS. 34-44 illustrate an example installation sequence. FIG. 34 shows a first set of ring segments 124 being installed around the wires 28 and assembled to create an uppermost ring 122a of FIG. 33.

Figure 35:
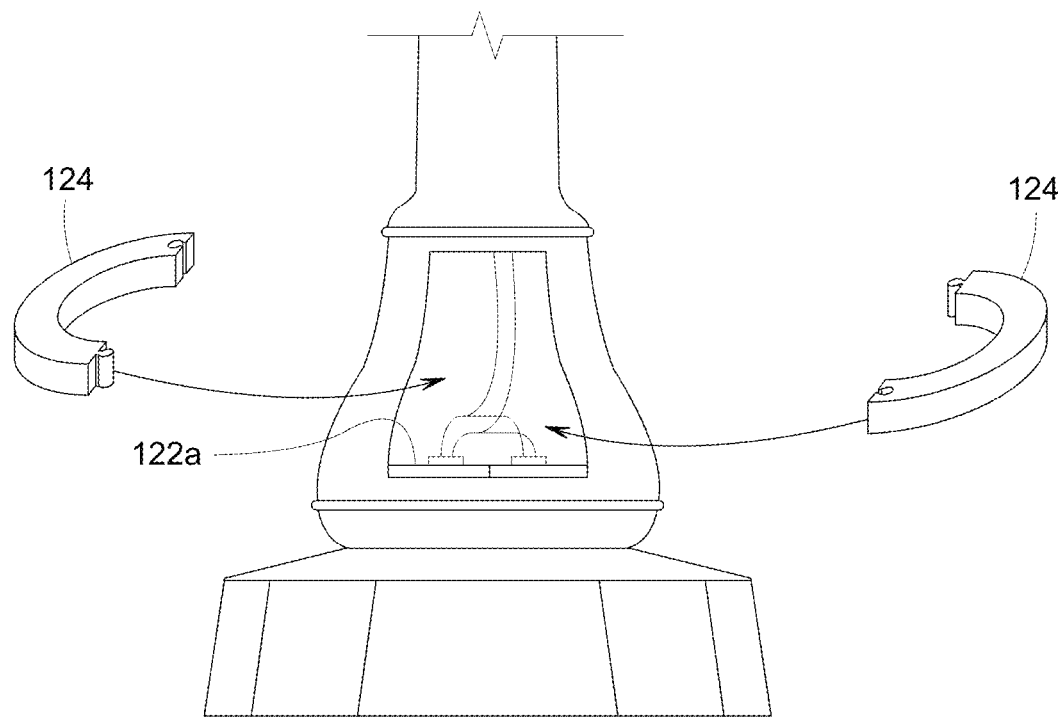
FIG. 35 is a front view showing another method step of assembling and installing the stack of rings within the base of the streetlight.

FIG. 35 shows a second set of ring segments 124 being installed and assembled to create the next ring 122b. This second ring 122b is placed underneath the first ring 122a, so the ring 122b will end up being the second ring from the top of the completed stack of rings 122.

Figure 36:
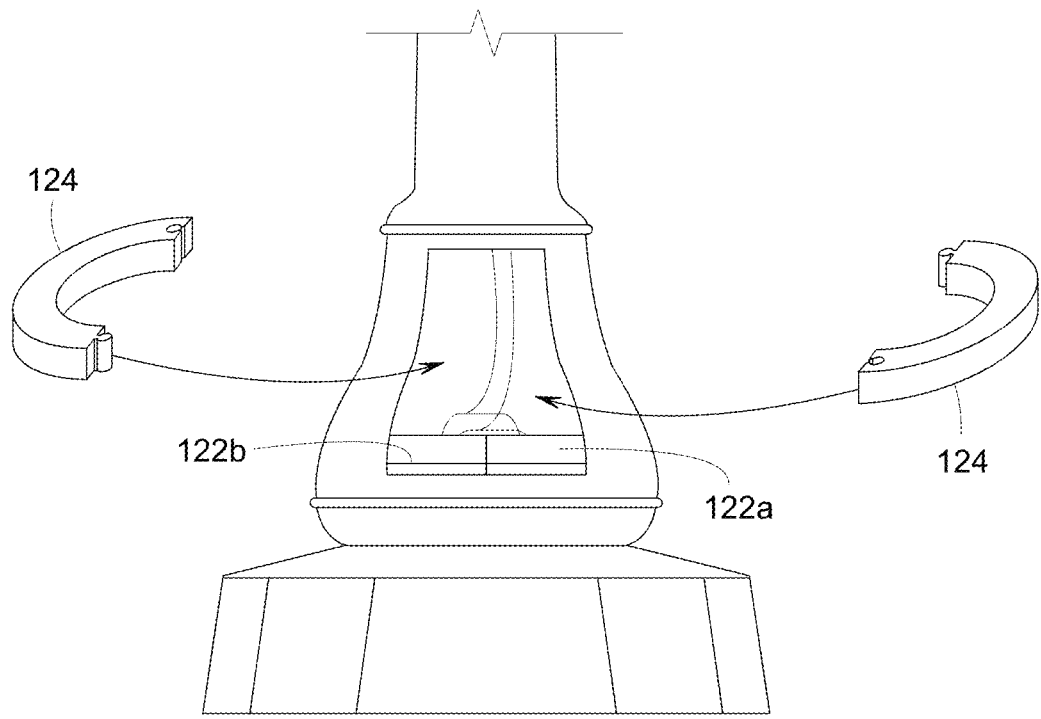
FIG. 36 is a front view showing another method step of assembling and installing the stack of rings within the base of the streetlight.

FIG. 36 shows a third set of ring segments 124 being installed and assembled to create the next ring 122c. This third ring 122c is placed underneath the second ring 122b, so the ring 122c will end up being the third ring from the top of the completed stack of rings 122.

Figure 37:
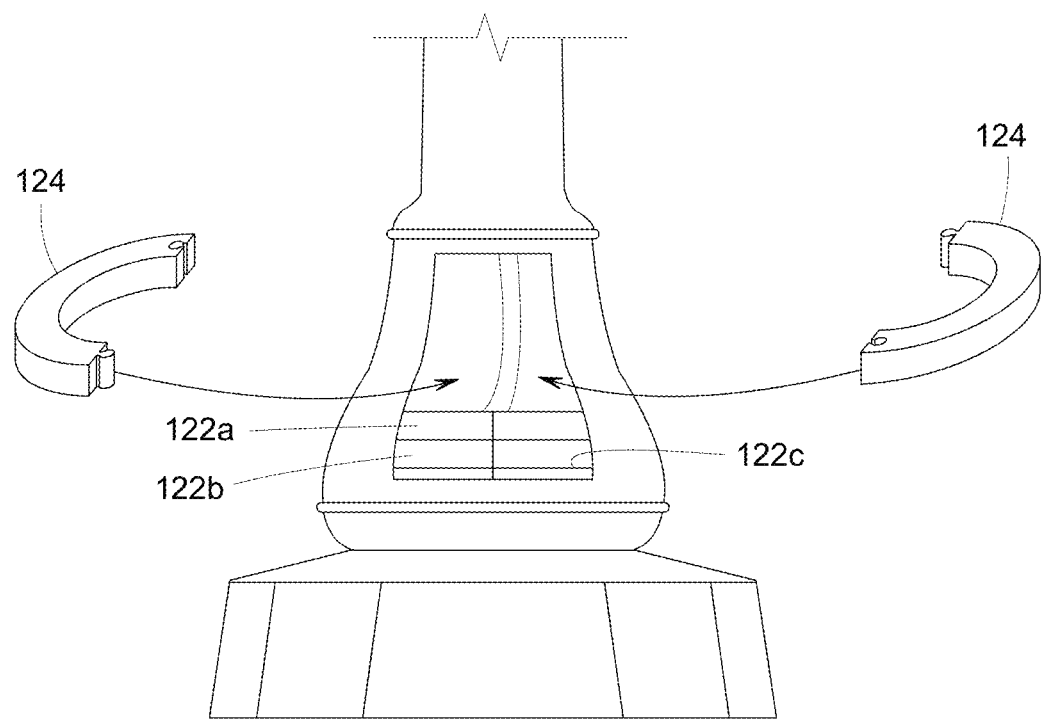
FIG. 37 is a front view showing another method step of assembling and installing the stack of rings within the base of the streetlight.

FIG. 37 shows a fourth set of ring segments 124 being installed and assembled to create the next ring 122d. This fourth ring 122d is placed underneath the third ring 122c, so the ring 122d will end up being the fourth ring from the top of the completed stack of rings 122.

Figure 38:
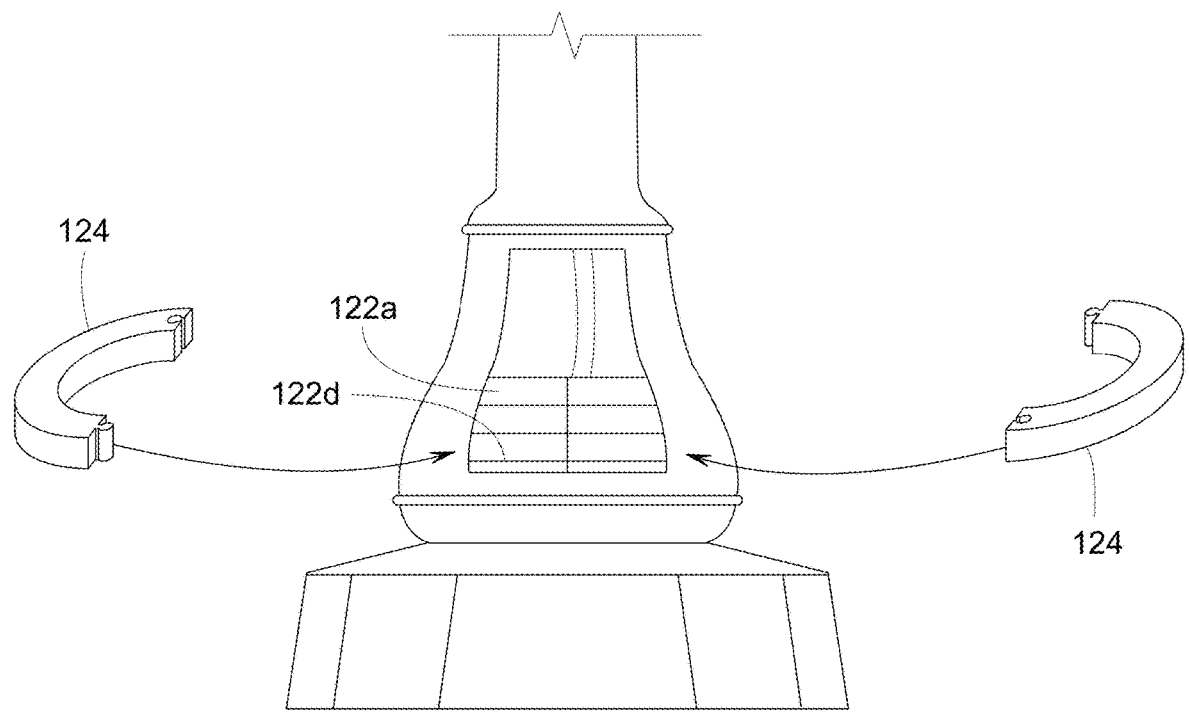
FIG. 38 is a front view showing another method step of assembling and installing the stack of rings within the base of the streetlight.

FIG. 38 shows a fifth set of ring segments 124 being installed and assembled to create the next ring 122e. This fifth ring 122e is placed underneath the fourth ring 122d, so the ring 122e will end up being the fifth ring from the top of the completed stack of rings 122.

Figure 39:
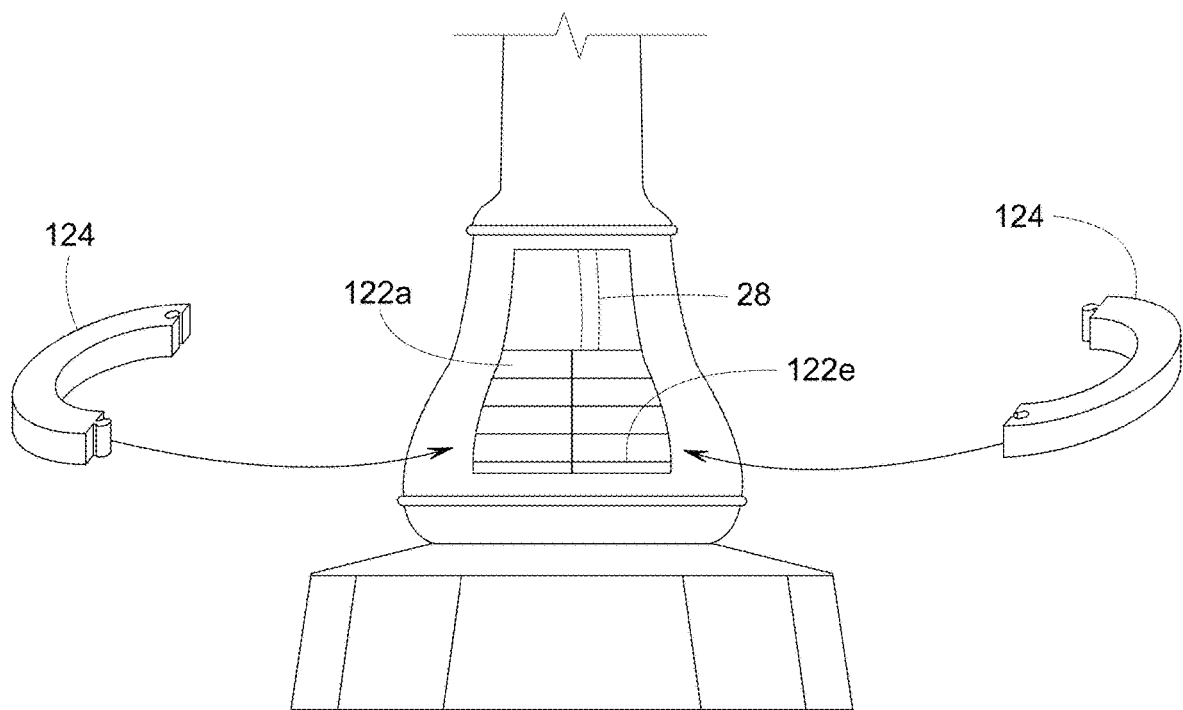
FIG. 39 is a front view showing another method step of assembling and installing the stack of rings within the base of the streetlight.

FIG. 39 shows a sixth set of ring segments 124 being installed and assembled to create the next ring 122f. This sixth ring 122f is placed underneath the fifth ring 122e, so the ring 122f will end up being the sixth ring from the top of the completed stack of rings 122.

Figure 40:
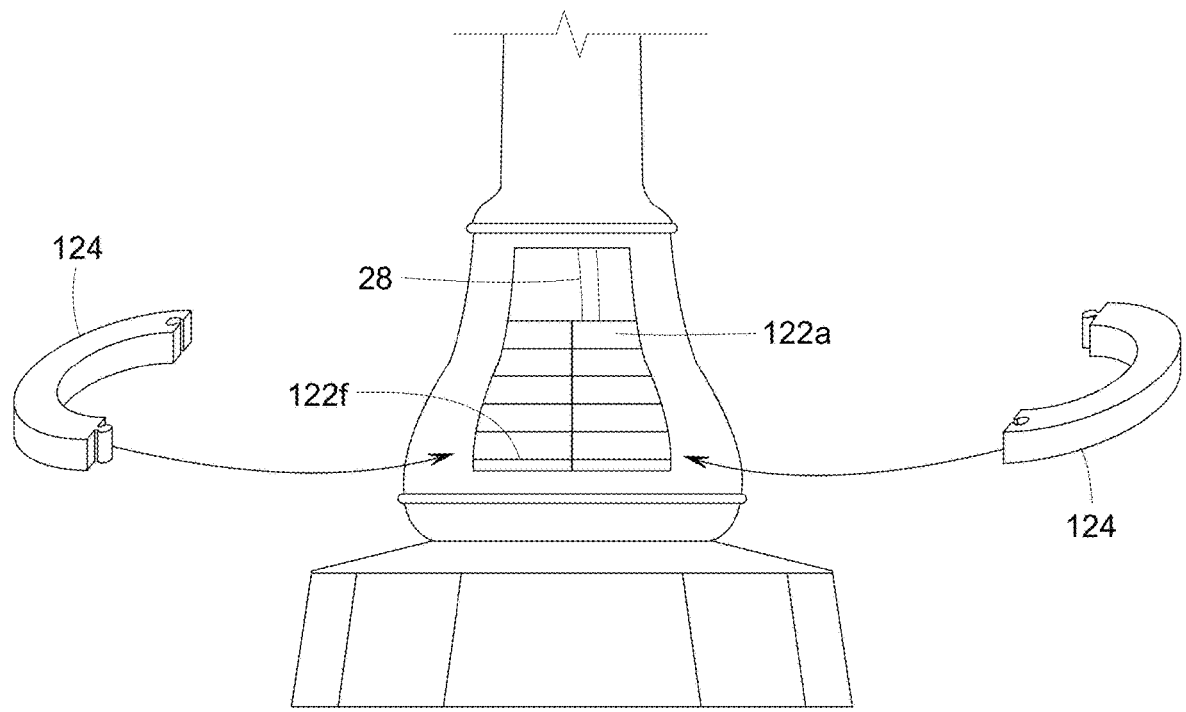
FIG. 40 is a front view showing another method step of assembling and installing the stack of rings within the base of the streetlight.

FIG. 40 shows a seventh set of ring segments 124 being installed and assembled to create the next ring 122g. This seventh ring 122g is placed underneath the sixth ring 122f, so the ring 122g will end up being the seventh ring from the top of the completed stack of rings 122.

Figure 41:
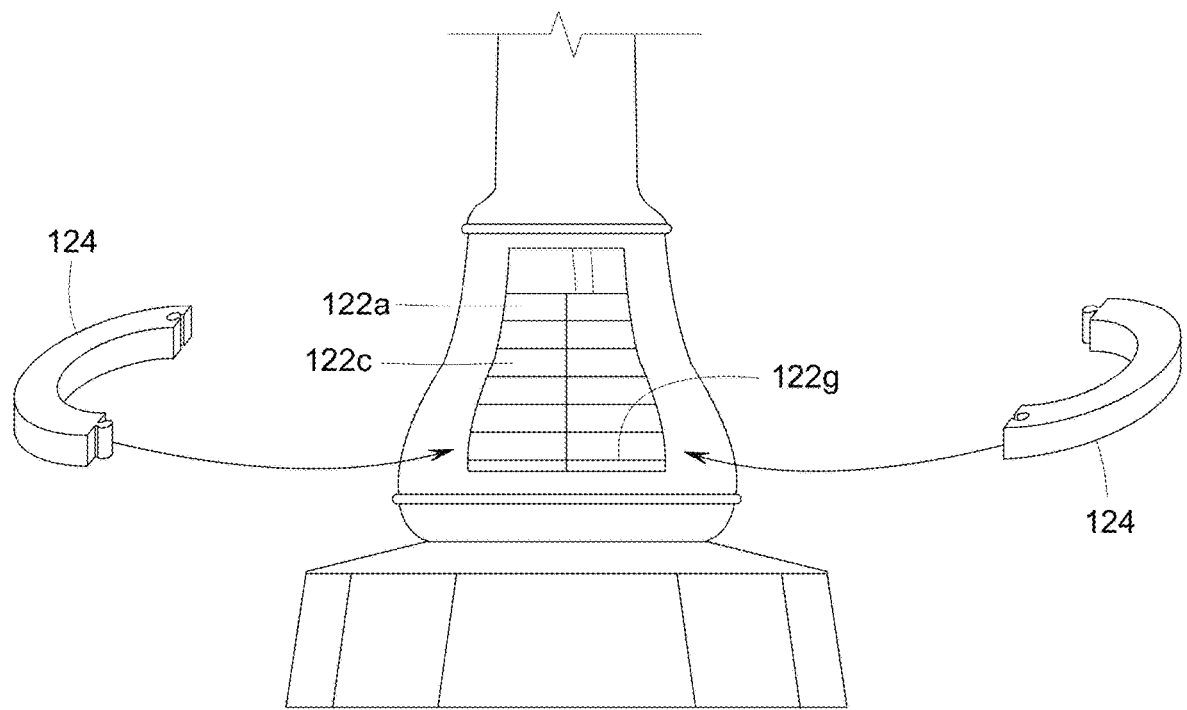
FIG. 41 is a front view showing another method step of assembling and installing the stack of rings within the base of the streetlight.

FIG. 41 shows an eighth set of ring segments 124 being installed and assembled to create the next ring 122h. This eighth ring 122h is placed underneath the seventh ring 122g, so the ring 122h will end up being the seventh ring from the top of the completed stack of rings 122.

Figure 42:
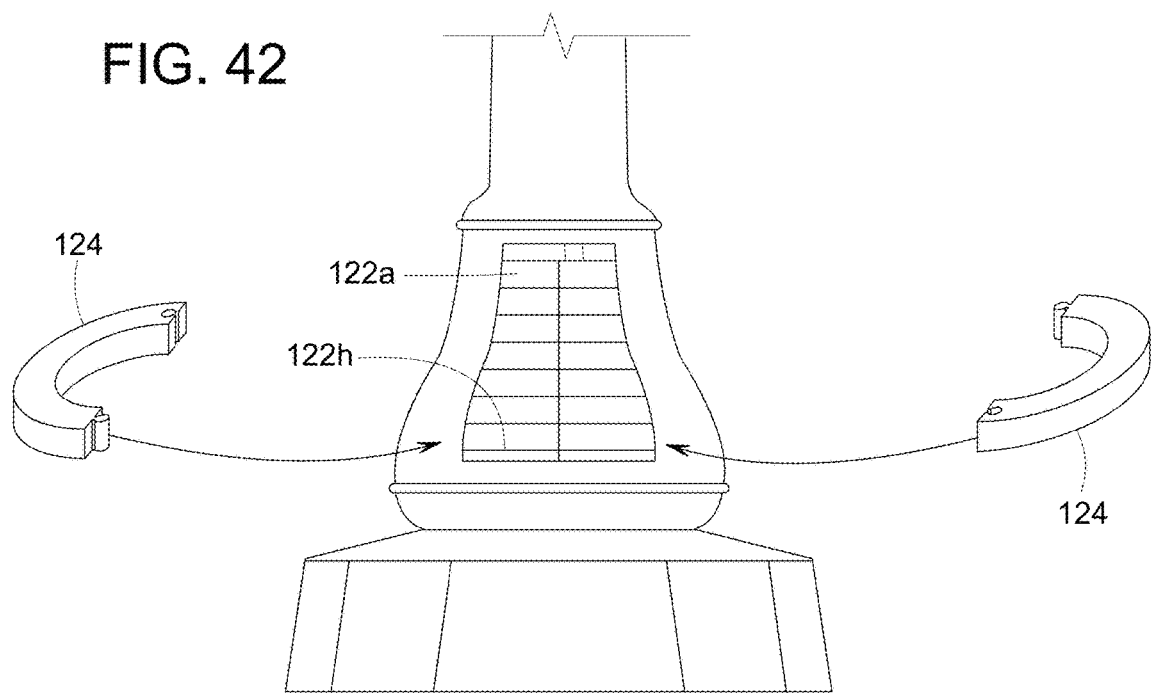
FIG. 42 is a front view showing another method step of assembling and installing the stack of rings within the base of the streetlight.

FIG. 42 shows a ninth set of ring segments 124 being installed and assembled to create the next ring 122i. This ninth ring 122i is placed underneath the eight ring 122h, so the ring 122i will end up being the bottom ring of the completed stack of rings 122.

Figure 43:
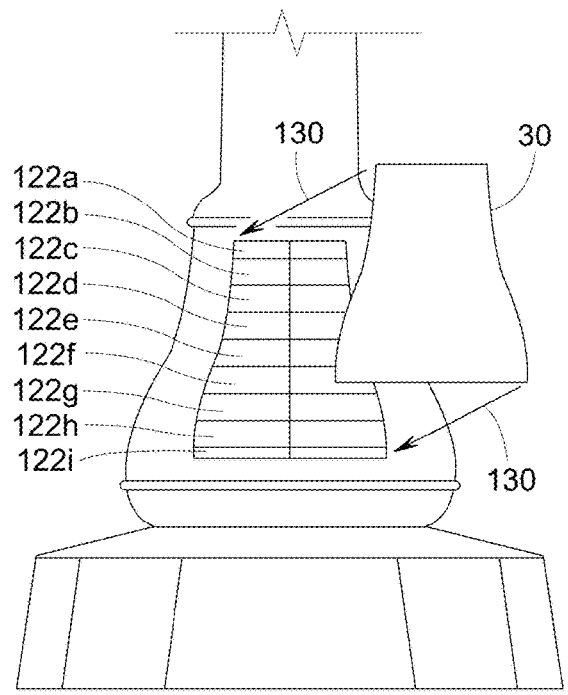
FIG. 43 is a front view showing a cover plate being reattached to the base.
Figure 44:
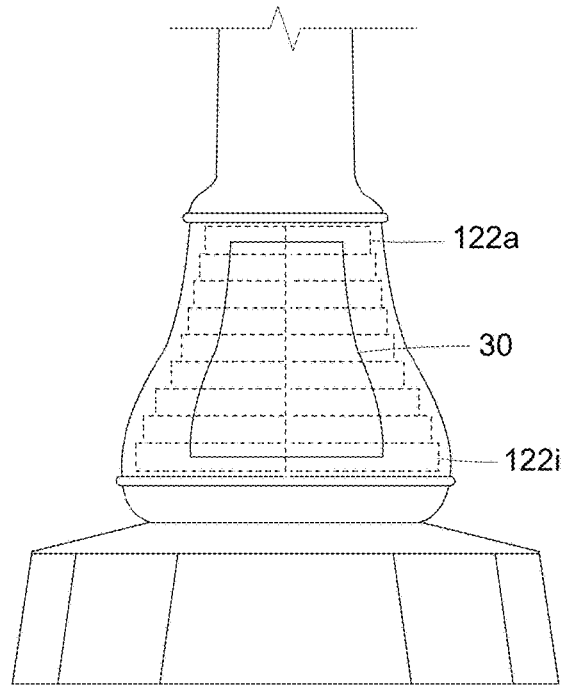
FIG. 44 is a front view showing the cover plate secured to the base with the internal stack of rings in phantom.

FIG. 43 shows the stack of rings 122 completely assembled and installed within the base 20. Arrows 130 represent the cover plate 30 being reattached to cover the access opening 126. FIG. 44 shows cover plate 30 secured to the base 20, with the internal stack of rings 122 shown in phantom.

In some examples, the rings of the stack of rings 122 vary in diameter to fit the inner contour of the base 20, sometimes filling or substantially filing the base's inner chamber 32. For instance, in the illustrated example, the uppermost ring 122a has a diameter 132 that is smaller than a diameter 134 of the bottom most ring 122i. In some examples, an authorized service vehicle carries a kit or an assortment of rings 122 of different diameters to custom build a stack of rings 122 that will fit streetlight bases of various shapes and sizes.

Figure 45:
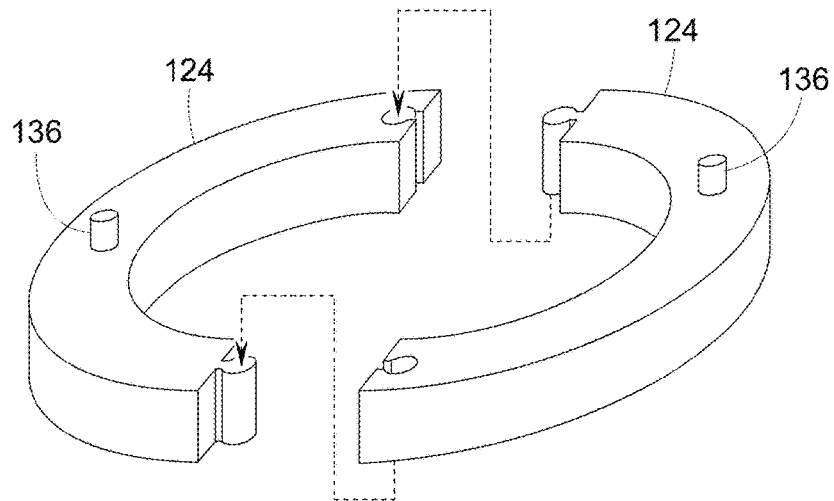
FIG. 45 is a perspective view similar to FIG. 31 but showing another example of a ring and its ring segments.
Figure 46:
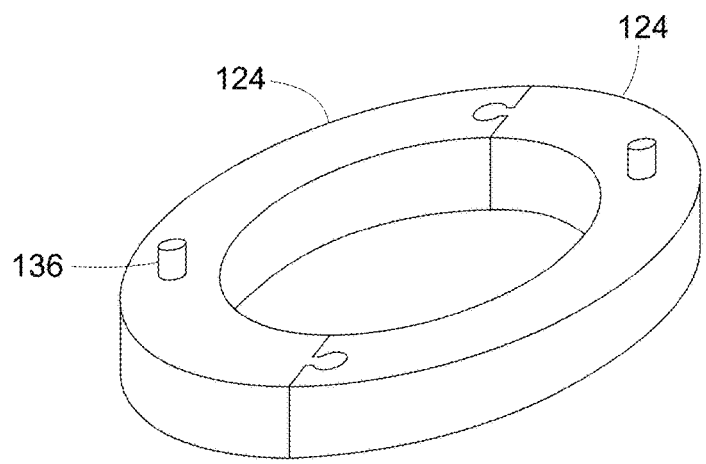
FIG. 46 is a perspective view show two ring segments assembled to create an example ring.
Figure 47:
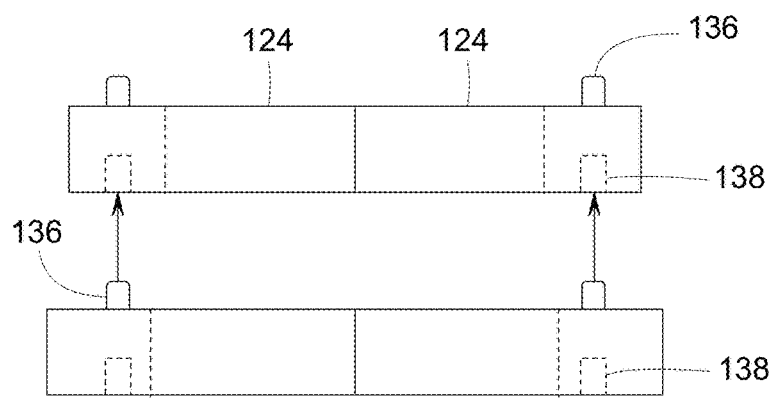
FIG. 47 is a front exploded view of two example rings similar to the ones shown in FIG. 46.

In some examples, as shown in FIGS. 45-47, the plurality of ring segments 124 are keyed axially. This ensures the stack of rings 122 are arranged in a desired rotational relationship. It also ensures that the stack of rings 122 rotate as a unit to prevent a thief from rotating individual rings 122 to a more favorable position for removal. In the illustrated example, pegs 136 and mating holes 138 provide an example means for axially keying the plurality of ring segments 124.

Figure 48:
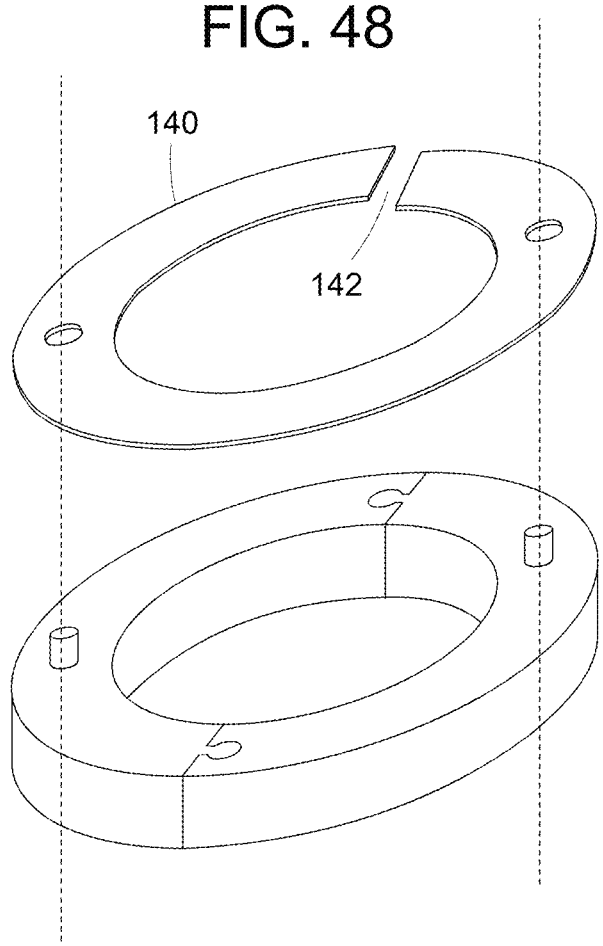
FIG. 48 is a perspective exploded view of an example sheet metal ring and another example ring.
Figure 49:
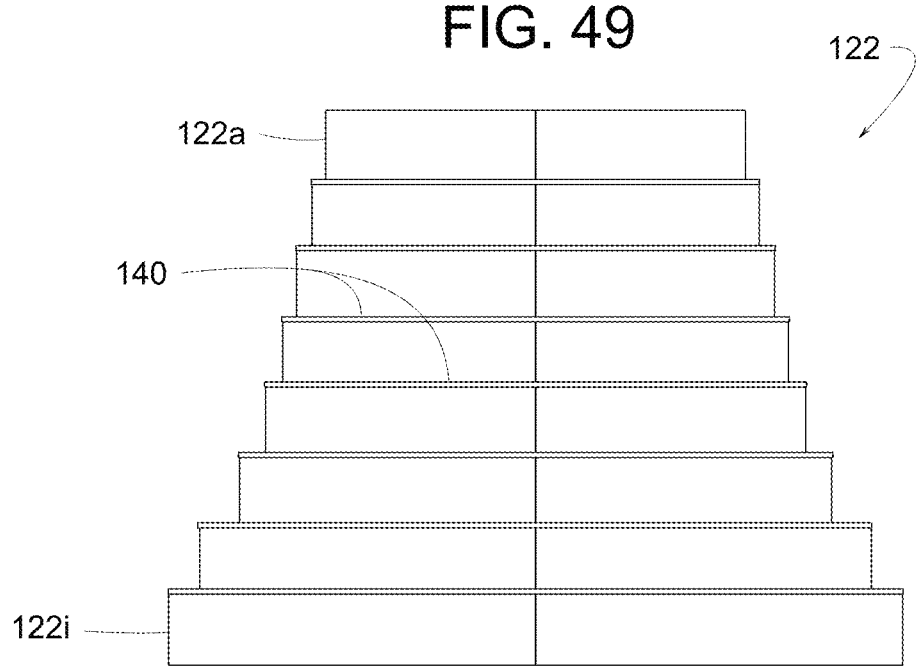
FIG. 49 is a front view of an example stack of rings with some interposed sheet metal rings.

In some examples, as shown in FIGS. 48 and 49, the stack of rings 122 includes a plurality of sheet metal discs 140 in an alternating stacked arrangement with a plurality of non-metallic rings. The sheet metal discs 140 make it more difficult for a thief to cut through the stack of rings 122 when the rings 122 are made from a polymer or the like. In some examples, the sheet metal discs 140 have a slit 142, so the metal discs 140 can be resiliently deformed and installed around the wires 28.

Figure 50:
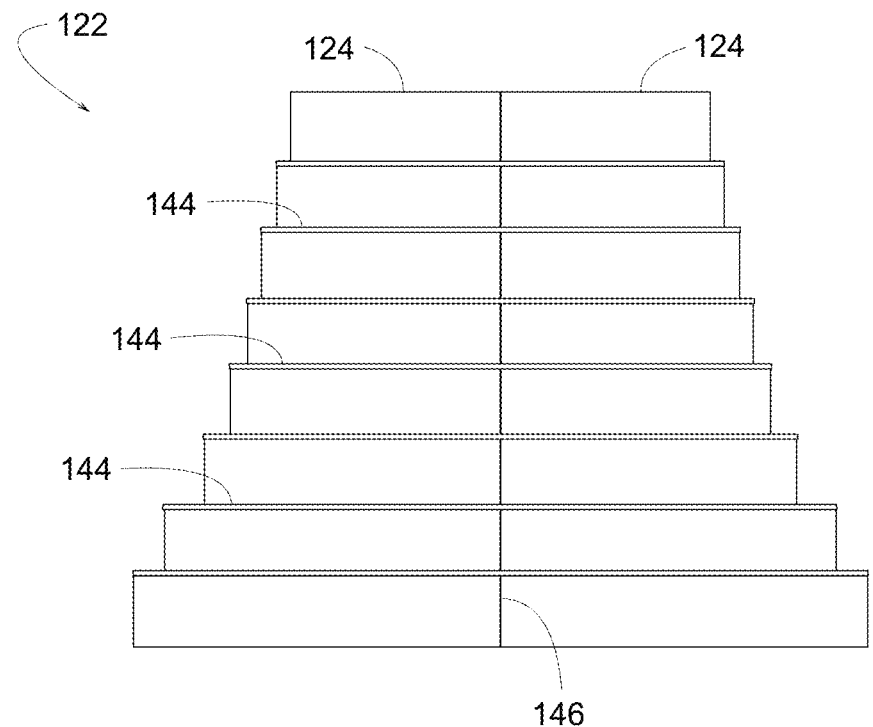
FIG. 50 is a front view of another example stack of rings with interposing adhesive layers.

In some examples, as shown in FIG. 50, the stack of rings 122 include a plurality of adhesive layers 144 that securely bond the stack of rings 122 together. In some examples, an adhesive layer 144 may be between each of the rings in the stack of rings 122. When the stack of rings 122 includes sheet metal discs 140 in an alternating stacked arrangement with a plurality of non-metallic rings, an adhesive layer 144 may be between each of the rings and interposing metal discs in the stack of rings 122.

Figure 51:
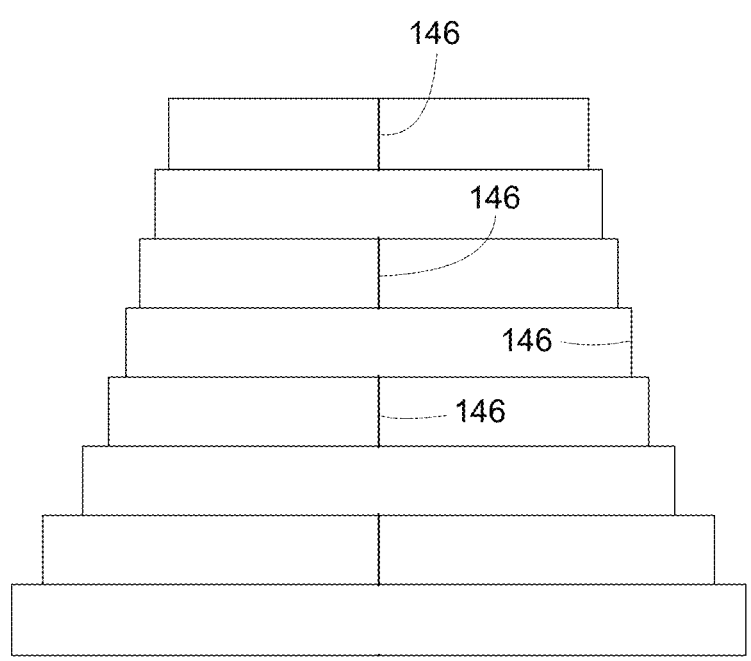
FIG. 51 is a front view of another example stack of rings with staggered joints.

In some examples, the joints 146 between the assembled ring segments 124 can be aligned, as shown in FIG. 50. Such an arrangement can provide a neater appearance and make the stack of rings 122 easier to assemble. In other examples, the joints 146 are staggered, such as shown in FIG. 51. A staggered arrangement can provide the stack of rings 122 with greater durability.

A kit may be provided to retrofit an existing streetlight with a protective barrier that impedes thieves from stealing electrical wires from a streetlight. The kit may include a plurality of ring segments, wherein each of the plurality of ring segments is configured to be: insertable through the access opening and into the chamber of the streetlight; assemblable in the chamber with at least one other of the plurality of ring segments to form a corresponding ring that extends around the electrical wires in the chamber; and stackable to form a plurality of stacked rings that extend around the electrical wires in the chamber. In some cases, each of the plurality of ring segments of the kit is configured to be interlocked circumferentially with the at least one other one of the plurality of ring segments to form the corresponding ring. In some cases, each of the plurality of ring segments of the kit is configured to be keyed axially with at least one other one of the plurality of ring segments when stacked to form the plurality of stacked rings in the chamber. In some cases, the plurality of ring segments of the kit includes ring segments of different sizes. In some cases, the kit may include a plurality of metal discs that are configured to be insertable through the access opening and into the chamber to be interposed between at least some of the plurality of stacked rings in the chamber. In some cases, the kit may include an adhesive to be interposed between at least some of the plurality of stacked rings. In some cases, the kit includes only some or all of these features.

The disclosure should not be considered limited to the particular examples described above. Various modifications, equivalent processes, as well as numerous structures to which the disclosure can be applicable will be readily apparent to those of skill in the art upon review of the instant specification.

What is claimed is:

1. A streetlight comprising:
   a base defining a chamber therein;
   a removable cover plate attached to the base to cover an access opening that leads to the chamber;
   a tubular pole extending upward from the base;
   a light fixture supported by the tubular pole;
   a conduit leading to the base;
   an electrical wire extending through the conduit, through the chamber of the base and through at least part of the tubular pole to provide power to the light fixture; and
   a stack of rings encircling the electrical wire within the chamber of the base, wherein each ring of the stack of rings includes a plurality of ring segments.

2. The streetlight of claim 1, wherein the stack of rings varies in diameter.

3. The streetlight of claim 1, wherein the plurality of ring segments interlock circumferentially.

4. The streetlight of claim 1, wherein the plurality of ring segments are keyed axially.

5. The streetlight of claim 1, further comprising a plurality of adhesive layers bonding the stack of rings together.

6. The streetlight of claim 1, wherein the stack of rings includes a plurality of metal discs.

7. The streetlight of claim 1, wherein each ring segment is sized to fit through the access opening while each ring is too large to fit through the access opening.

8. The streetlight of claim 1, wherein the stack of rings includes an upper most ring and a lower most ring, and the upper most ring has an outer dimension that is smaller than that of the lower most ring.

9. The streetlight of claim 1, wherein at least some of the plurality of ring segments are made of a plastic.

10. A method for providing a protective barrier that impedes thieves from stealing electrical wires from a streetlight, wherein the streetlight includes a base defining a chamber, a removable cover plate attached to the base to cover an access opening that leads to the chamber, and a light fixture, wherein the electrical wires extend through the chamber of the base and to the light fixture to provide power to the light fixture, the method comprising:

providing a plurality of ring segments through the access opening and into the chamber of the streetlight; and
assembling the plurality of ring segments while in the chamber into a plurality of stacked rings that extend around the electrical wires in the chamber.

11. The method of claim 10, wherein assembling the plurality of ring segments comprises:
   assembling a first one of the plurality of ring segments with a second one of the plurality of ring segments to form a first ring that extends around the electrical wires in the chamber;
   assembling a third one of the plurality of ring segments with a fourth one of the plurality of ring segments to form a second ring that extends around the electrical wires in the chamber; and
   stacking the first ring and the second ring in the chamber around the electrical wires in the chamber in an axial arrangement.

12. The method of claim 11, comprising securing the first ring to the second ring in the axial arrangement.

13. The method of claim 11, comprising interpose a metal disc between the first ring and the second ring.

14. The method of claim 10, wherein assembling the plurality of ring segments comprises stacking the plurality of ring segments to form the plurality of stacked rings that extend around the electrical wires in the chamber.

15. A kit for providing a protective barrier that impedes thieves from stealing electrical wires from a streetlight, wherein the streetlight includes a base defining a chamber, a removable cover plate attached to the base to cover an access opening that leads to the chamber, and a light fixture, wherein the electrical wires extend through the chamber of the base and to the light fixture to provide power to the light fixture, the kit comprising:
   a plurality of ring segments, wherein each of the plurality of ring segments is configured to be:
      insertable through the access opening and into the chamber of the streetlight;
      assemblable in the chamber with at least one other of the plurality of ring segments to form a corresponding ring that extends around the electrical wires in the chamber; and
      stackable to form a plurality of stacked rings that extend around the electrical wires in the chamber.

16. The kit of claim 15, wherein each of the plurality of ring segments is configured to be interlocked circumferentially with the at least one other one of the plurality of ring segments to form the corresponding ring.

17. The kit of claim 15, wherein each of the plurality of ring segments is configured to be keyed axially with at least one other one of the plurality of ring segments when stacked to form the plurality of stacked rings in the chamber.

18. The kit of claim 15, wherein the plurality of ring segments includes ring segments of different sizes.

19. The kit of claim 15, further comprising a plurality of metal discs that are configured to be insertable through the access opening and into the chamber to be interposed between at least some of the plurality of stacked rings in the chamber.

20. The kit of claim 15, further comprising an adhesive to be interposed between at least some of the plurality of stacked rings.

* * * * *